(12) United States Patent
Nagata

(10) Patent No.: US 7,142,325 B2
(45) Date of Patent: Nov. 28, 2006

(54) DOCUMENT MANAGEMENT DEVICE, COMMUNICATIONS TERMINAL DEVICE, DOCUMENT MANAGEMENT PROGRAM, COMMUNICATIONS CONTROL PROGRAM AND DOCUMENT MANAGEMENT SYSTEM

(75) Inventor: Yoshinori Nagata, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1077 days.

(21) Appl. No.: 09/729,426

(22) Filed: Dec. 5, 2000

(65) Prior Publication Data

US 2002/0015186 A1   Feb. 7, 2002

(30) Foreign Application Priority Data

Dec. 7, 1999   (JP)   ............... 11-348012

(51) Int. Cl.
G06F 15/00   (2006.01)

(52) U.S. Cl. ............ 358/1.18; 358/403; 358/405; 358/402; 358/538; 358/453; 358/1.15; 358/466; 382/305; 382/306; 382/282; 382/218; 379/114.02

(58) Field of Classification Search ........... 382/306, 382/305, 282, 185, 317, 218; 358/1.18, 403, 358/405, 538, 453, 1.15, 404, 468, 450, 1.14, 358/1.16; 379/130, 114.02; 370/338, 352; 700/223; 708/505; 707/6, 10, 103 R; 710/8; 713/100; 715/505

See application file for complete search history.

(56) References Cited

U.S. PATENT DOCUMENTS

| 4,604,653 A | * | 8/1986 | Shimizu | 358/403 |
| 4,813,078 A | * | 3/1989 | Fujiwara et al. | 382/185 |
| 4,975,783 A | * | 12/1990 | Takaoka | 358/404 |
| 5,016,209 A | * | 5/1991 | Ikeda et al. | 708/505 |
| 5,084,769 A | | 1/1992 | Miura | |
| 5,153,744 A | | 10/1992 | Nobuta | |
| 5,222,157 A | * | 6/1993 | Yoneda et al. | 382/306 |
| 5,293,256 A | * | 3/1994 | Fukushima et al. | 358/468 |
| 5,313,572 A | * | 5/1994 | Yamamoto et al. | 358/403 |
| 5,638,433 A | * | 6/1997 | Bubien et al. | 379/130 |
| 5,682,540 A | * | 10/1997 | Klotz et al. | 715/505 |
| 5,682,549 A | * | 10/1997 | Tanaka et al. | 710/8 |
| 5,717,940 A | | 2/1998 | Peairs | |
| 5,819,301 A | * | 10/1998 | Rowe et al. | 715/513 |
| 5,877,963 A | * | 3/1999 | Leung et al. | 700/223 |
| 5,878,121 A | * | 3/1999 | Nakanishi | 379/114.02 |

(Continued)

FOREIGN PATENT DOCUMENTS

JP   3-63877 A   3/1991

(Continued)

OTHER PUBLICATIONS

European Search Report for EP 00 12 6434, Dec. 17, 2004.

(Continued)

*Primary Examiner*—Twyler Lamb
*Assistant Examiner*—Beniyam Menberu
(74) *Attorney, Agent, or Firm*—Nixon & Vanderhye, PC

(57) ABSTRACT

A document management device obtains thumbnail information as to a requested document out of an image transmitted via a public network, judges as to whether the thumbnail information is correct with respect to the requested document, and returns the requested document when correct. This prevents a person having no knowledge of the thumbnail information from obtaining a document from a device main body, thereby tightening security for document management in the main body and providing the document management device capable of fully managing even a document requiring higher security.

23 Claims, 20 Drawing Sheets

U.S. PATENT DOCUMENTS

| | | | |
|---|---|---|---|
| 5,887,088 A * | 3/1999 | Kurokawa et al. | 382/317 |
| 5,930,801 A * | 7/1999 | Falkenhainer et al. | 707/103 R |
| 6,011,634 A * | 1/2000 | Aihara et al. | 358/468 |
| 6,128,102 A * | 10/2000 | Ota | 358/403 |
| 6,275,308 B1 * | 8/2001 | Yoshida | 358/450 |
| 6,356,541 B1 * | 3/2002 | Muller et al. | 370/338 |
| 6,366,576 B1 * | 4/2002 | Haga | 370/352 |
| 6,424,429 B1 * | 7/2002 | Takahashi et al. | 358/1.16 |
| 6,512,593 B1 * | 1/2003 | Yashiki | 358/1.15 |
| 6,560,704 B1 * | 5/2003 | Dieterman et al. | 713/100 |
| 6,628,412 B1 * | 9/2003 | Jeran et al. | 358/1.14 |
| 6,636,635 B1 * | 10/2003 | Matsugu | 382/218 |
| 6,661,933 B1 * | 12/2003 | Hisatomi et al. | 382/306 |
| 6,725,221 B1 * | 4/2004 | Murakami et al. | 707/10 |
| 6,832,221 B1 * | 12/2004 | Takahashi | 707/6 |
| 2002/0010718 A1 * | 1/2002 | Miller | 707/526 |

FOREIGN PATENT DOCUMENTS

| | | |
|---|---|---|
| JP | 7-7554 | 1/1995 |
| JP | 7-236047 A | 9/1995 |
| JP | 8-130594 | 5/1996 |
| JP | 10-171839 A | 6/1998 |
| JP | 11-45277 A | 2/1999 |

OTHER PUBLICATIONS

Japanese Office Action and English translation thereof mailed Jun. 22, 2004 in corresponding Japanese application No. 11-348012/1999.

Cohen, "Access and Retrieval from Image Database Using Image Thumbnails", Proc. Int'l. Conf. Signal Processing Applications, vol. 1, Aug. 26, 1996, pp. 427-428.

Communication from EPO dated Sep. 6, 2004 in corresponding EP application No. 00126434.0-1527.

* cited by examiner

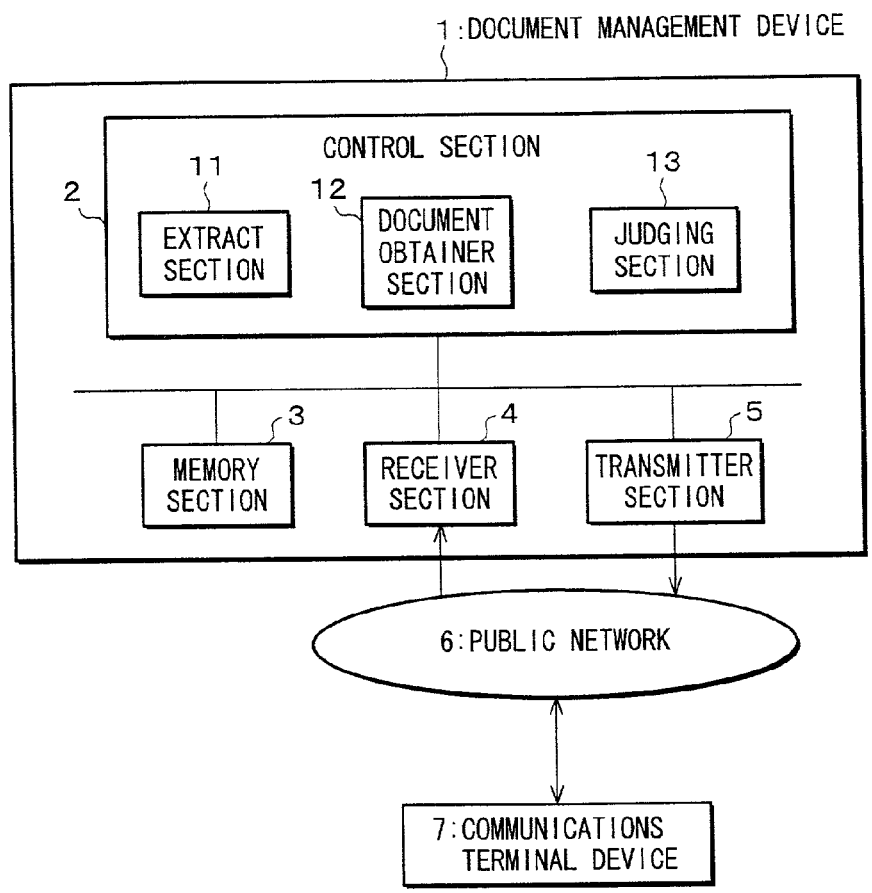

F I G. 5

20:DOCUMENT MANAGEMENT TABLE

| DOCUMENT ID | DATE OF CREATION | FILE PATH | DATE OF CREATION | FILE PATH | ... |
|---|---|---|---|---|---|
| ID 1 | DATE 1A | FILE PATH 1A | DATE 1B | FILE PATH 1B | ... |
| ID 2 | DATE 2A | FILE PATH 2A | DATE 2B | FILE PATH 2B | ... |
| ... | ... | ... | ... | ... | ... |
| ID n | DATE nA | FILE PATH nA | DATE nB | FILE PATH nB | ... |

FIG. 8

21: DOCUMENT REQUEST FORM

| TITLE | DATE | ○ |—22
|---|---|---|
| THUMBNAIL ON PAGE 1 | THUMBNAIL ON PAGE 2 | THUMBNAIL ON PAGE 3 |
| THUMBNAIL ON PAGE 4 | THUMBNAIL ON PAGE 5 | THUMBNAIL ON PAGE 6 |
| DOCUMENT ID | COMMUNICATION NUMBER | |

F I G. 1 0
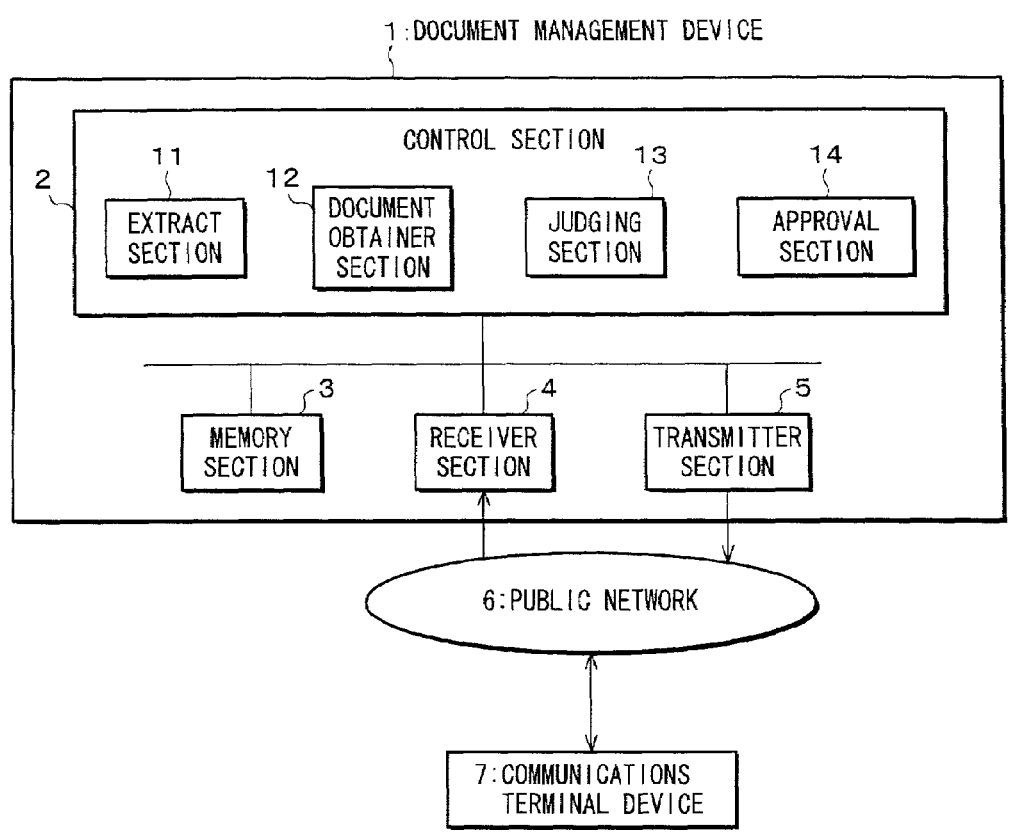

FIG. 11

21: DOCUMENT REQUEST FORM

| TITLE | DATE | |
|---|---|---|
| THUMBNAIL ON PAGE 1 | THUMBNAIL ON PAGE 2 | THUMBNAIL ON PAGE 3 |
| THUMBNAIL ON PAGE 4 | THUMBNAIL ON PAGE 5 | THUMBNAIL ON PAGE 6 |
| DOCUMENT ID | COMMUNICATION NUMBER | 1234567 — 23 |

FIG. 12

20: DOCUMENT MANAGEMENT TABLE

| DOCUMENT ID | FILE PATH | APPROVAL INFORMATION | | |
|---|---|---|---|---|
| ID 1 | FILE PATH 1 | APPROVAL INFORMATION 1A | APPROVAL INFORMATION 1B | ... |
| ID 2 | FILE PATH 2 | APPROVAL INFORMATION 2A | APPROVAL INFORMATION 2B | ... |
| ... | ... | ... | ... | ... |
| ID n | FILE PATH n | APPROVAL INFORMATION nA | APPROVAL INFORMATION nB | ... |

FIG. 14

21:DOCUMENT REQUEST FORM

| TITLE | DATE | |
|---|---|---|
| THUMBNAIL ON PAGE 1 | THUMBNAIL ON PAGE 2 | THUMBNAIL ON PAGE 3 |
| THUMBNAIL ON PAGE 4 | THUMBNAIL ON PAGE 5 | THUMBNAIL ON PAGE 6 |
| DOCUMENT ID | COMMUNICATION NUMBER | 1234567 ~23 |

FIG. 18

51:LINE NUMBER INPUT FORM

FAX SENDING SHEET

RECEIVING END
LINE NUMBERS 01-123-4567
03-542-3687
06-398-5483
0745-25-3549
．
．
．

52: CONNECTION CHARGE TABLE

| AREA CODE | CHARGE FOR CALL |
|-----------|-----------------|
| 01        | 10              |
| 012       | 20              |
| 013       | 20              |
|           |                 |

51:LINE NUMBER INPUT FORM

RECEIVING END
LINE NUMBERS
01-123-4567
03-542-3687
06-398-5483
0745-25-3549
.
.
.

DOCUMENT MANAGEMENT DEVICE, COMMUNICATIONS TERMINAL DEVICE, DOCUMENT MANAGEMENT PROGRAM, COMMUNICATIONS CONTROL PROGRAM AND DOCUMENT MANAGEMENT SYSTEM

FIELD OF THE INVENTION

The present invention relates to a document management device which outputs a document under management thereof in accordance with an inputted image, a communications terminal device which carries out communications of an image with a station connected via a public network, a document request form which is suitable for inputting the image in the document management device, a line number input form which is suitable for inputting a line number with respect to the communications terminal device, and a document management system which connects the document management device and the communications terminal device by utilizing a network such as the public network.

BACKGROUND OF THE INVENTION

Conventionally, technology of image communications between devices which are connected via a public network has been utilized in a variety of styles.

For example, U.S. Pat. No. 5,084,769 (Date of Patent: Jan. 28, 1992) discloses a document management device which receives an image transmitted from a facsimile (fax) machine which is connected via the public network, extracts a document corresponding to the received image by searching a database, and transmits the document extracted out of the database to the fax machine. Utilizing the foregoing device, a user needs only to transmit an appropriate image (an image which requests the document management device to transmit a desired document) by an arbitrary fax machine so as to obtain a desired document under the management of the document management device. Thus, the user, regardless of where he or she is, can obtain a desired document, which is under the management of the document management device, by fax from anywhere he or she can use a fax machine which is connected to the public network.

Further, Japanese Unexamined Patent Publication No. 236047/1995 (Tokukaihei 7-236047 published on Sep. 5, 1995) discloses providing a main body of a fax machine used in image communications with a function (i) to read out a line number at a receiving end which is written on a document to be transmitted, (ii) to automatically request a station of the read-out line number to connect a line, and (iii) to transmit a document image once the line is connected. This fax machine does not require a user to input a line number at a receiving end by having the foregoing function, thereby improving controllability at the time of transmission.

On the other hand, the document management device of U.S. Pat. No. 5,084,769 has an arrangement in which, when receiving an image transmitted via the public network, i.e., a request for transmission of a document which is managed in a main body, the requested document is extracted out of a database without reservation so as to transmit it. Therefore, there has been a problem that anyone can freely obtain the document under the management of the document management device. That is, the conventional document management device could not manage, for example, a document which is disclosed only to a specific person, i.e., a document of a limited disclosure. Thus, there has been a problem that the conventional document management device fails to provide adequate security of documents managed in the main body.

Further, since, recently, there have been a plurality of service providers each of which provides communications lines and has its own tariff of charges for the use of a line, communications charges vary depending on a line used even when the same station is connected with lines (when the same station is used in communications). On the other hand, users wish to use a line of the least cost of communications if the same station is used to connect a line.

However, due to a fact that a service provider which provides the line of the least cost of communications is changed as a communications partner station is changed, it is difficult for a user to select a line for use depending on a communications partner with which a line is connected, and even if it was possible it will only be made at much expense in time and effort. With respect to this problem, there has been proposed a communications terminal device having a function to automatically select a line for use based on a line number which a user inputted [a so-called Least Cost Routing (LCR) function].

Meanwhile, recently, a network system which enables a user to obtain the same service by making access to any of server devices for providing information services (for example, the foregoing document management device) which are provided on a plurality of sites all over the country has been established. However, it should be noted that the LCR function is a function to select a line to connect stations at transmitting and receiving ends, but not to select a communications partner station requiring the least cost of communications out of a plurality of communications partner stations. Therefore, the user him/herself should have determined the server device (access point) with which the line is connected. This has raised such a problem that it is difficult to select a server device which always requires the least cost of communications, thereby wasting money on communications. Particularly, since there is a possible change of a server device requiring the least cost of communications in accordance with a change of a site where a terminal device for use is provided, it has been difficult for the user him/herself to select a server device requiring the least cost of communications when making access thereto while on a trip, for example.

SUMMARY OF THE INVENTION

It is a first object of the present invention to provide a document management device capable of improving security of documents managed in a main body and sufficiently managing a document requiring stricter security, by outputting a requested document in response to an output request for an inputted document when the output request satisfies a predetermined condition.

It is a second object of the present invention to provide a communications terminal device capable of suppressing an extravagance in the cost of communications by automatically selecting an access point requiring the least cost of communications out of a plurality of access points and connecting a line with the selected access point.

It is a third object of the present invention to provide a recording medium storing a document management program capable of improving security of documents managed in a main body and sufficiently managing a document requiring stricter security, by outputting a requested document in response to an output request for an inputted document when the output request satisfies a predetermined condition.

It is a fourth object of the present invention to provide a recording medium storing a communications control program capable of suppressing an extravagance in the cost of communications by automatically selecting an access point requiring the least cost of communications out of a plurality of access points and connecting a line with the selected access point.

It is a fifth object of the present invention to provide a document management system capable of desirable document management by using the document management device and the communications terminal device.

In order to attain the foregoing first object, the document management device according to the present invention includes:

a memory section for storing a document to which an identification number is given;

an input section for receiving input of an image including the identification number and summary information of the document to which the identification number is given;

a control section made up of an extract section for extracting the identification number and the summary information from the inputted image which was inputted to the input section, a document obtainer section for obtaining a document extracted by the extract section which is given an identification number by detecting it out of documents stored in the memory section, and a determining section for determining as to whether the summary information extracted by the extract section is correct with respect to the document obtained by the document obtainer section; and an output section for outputting the document obtained by the document obtainer section when the determining section determines it to be correct.

With the foregoing structure, when extracting the identification number for identifying a document and the summary information of the document to which the identification number is given out of the inputted image while obtaining the document to which the extracted identification number is given out of the memory section, it is determined as to whether the summary information extracted out of the inputted image is correct with respect to the obtained document, and when it is correct, the document obtained from the memory section is outputted.

Thus, it is possible to suppress that a document under the management of a main body be obtained by a person having no knowledge of correct summary information, thereby improving security for document management, and being capable of managing even a document requiring higher security.

In order to attain the foregoing second object, the communications terminal device according to the present invention includes:

an image reader section for reading a document image out of a document;

a control section having a line number extractor section for extracting a plurality of line numbers of external devices to be connected to a line out of the document image which was read out by the image reader section, and a line number selector section for selecting a line number for connection from the plurality of line numbers extracted by the line number extractor section; and an image transmitter section for transmitting the document image which was read out by the image reader section with respect to an external device connected to the line, wherein, when the line number extractor section extracts the plurality of line numbers of the external devices to be connected to a line out of the document image, the line number selector section selects one line number from the plurality of line numbers extracted, by making a comparison between the plurality of line numbers extracted and a line number of the transmitting end.

With the foregoing arrangement, when a plurality of line numbers of the external device to be connected to a line are extracted out of the document image read out by the image reader section, one of the plurality of line numbers extracted by using the line number of the transmitting end is arranged to be selected. For example, by arranging to select the external device having the same area code as that of the transmitting end, a local call is used, thereby suppressing waste of communications costs.

Further, by having a document in which the plurality of line numbers of the external device are written, an appropriate line can be selected at any time even when traveling.

Further, a communications terminal device may have an arrangement to include:

an image reader section for reading a document image out of a document;

a control section having a line number extractor section for extracting a plurality of line numbers of external devices to be connected to a line out of the document image which was read out by the image reader section, and a line number selector section for selecting a line number for connection from the plurality of line numbers extracted by the line number extractor section;

a memory section for storing a communications costs table in which communications charges per unit time for connecting the line are classified based on the line numbers; and an image transmitter section for transmitting the document image which was read out by the image reader section with respect to an external device connected to the line, wherein, when the line number extractor section extracts the plurality of line numbers of the external devices to be connected to the line out of the document image, the line number selector section selects one line number from the plurality of line numbers extracted, using the communications costs table stored in the memory section.

With the foregoing arrangement, since the communications cost table is stored in the main body, waste of communications costs due to the use of the line can surely be prevented.

In order to attain the foregoing third object, a recording medium which stored a document management program which is used in a computer system including a memory section for storing a document to which an identification number is given, an input section for receiving an image including the identification number and summary information of the document to which the identification number is given, and an output section for outputting the document, the document management program for instructing a computer to execute the processes of:

(i) extracting the identification number and the summary information out of an inputted image which was inputted to the input section;

(ii) searching and obtaining a document having the identification number extracted by the process (i) out of documents stored in the memory section; and (iii) judging as to whether the summary information extracted by the process (i) is correct with respect to the document obtained by the process (ii).

With this arrangement, the identification number for identifying a document and the summary information having the identification number are extracted from the inputted image, and when the document having the extracted identification number is obtained from the memory section, it is judged as to whether the summary information extracted from the inputted image is correct with respect to the obtained image, and when correct, output of the document obtained from the memory section is carried out.

Accordingly, it is possible to suppress that a document under the management of the main body be obtained by a person having no knowledge of correct summary information, thereby improving security for document management, and being capable of managing even a document requiring higher security.

In order to attain the foregoing fourth object, a recording medium which stored a communications control program which is used in a computer system including an image reader section for reading a document image out of a document, and an image transmitter section for transmitting the document image read out by the image reader section with respect to an external device which is connected via a communications network, the communications control program for instructing a computer to execute the processes of:

(i) extracting a plurality of line numbers of external devices to be connected to a line out of the document image which was read out by the image reader section; and (ii) selecting, when the plurality of line numbers of the external devices to be connected to a line are extracted by the process (i) out of the document image, one line number from the plurality of line numbers extracted by making a comparison between the plurality of line numbers extracted and a line number of the transmitting end.

With this arrangement, when a plurality of line numbers of the external device to be connected to the line are extracted from the document image read by the image reader section, one of the plurality of line numbers extracted by using the line number at the transmitting end is arranged to be selected. For example, by arranging to select the external device having the same area code as that of the transmitting end, a local call is used, thereby suppressing waste of communications costs.

Further, by having a document in which the plurality of line numbers of the external device are written, an appropriate line can be selected at any time even when traveling.

Further, in order to attain the foregoing fifth object, a document management system, including at least one document management device, and at least one communications terminal device which is connected to the document management device via a communications network, wherein:

the document management device includes: a memory section for storing a document to which an identification number is given; an input section for receiving an image including the identification number and summary information of the document to which the identification number is given from the communications terminal device; a control section made up of an extract section for extracting the identification number and the summary information from the inputted image which was inputted to the input section, a document obtainer section for searching and obtaining a document having the identification number which was extracted by the extract section out of documents stored in the memory section, and a judging section for judging as to whether the summary information extracted by the extract section is correct with respect to the document obtained by the document obtainer section; and an output section for outputting the document obtained by the document obtainer section with respect to the communications terminal device when the judging section judges it to be correct, and the communications terminal device includes: an image reader section for reading a document image out of a document; a control section having a line number extractor section for extracting a plurality of line numbers of document management devices to be connected to a line out of the document image which was read out by the image reader section, and a line number selector section for selecting a line number for connection from the plurality of line numbers extracted by the line number extractor section; and an image transmitter section for transmitting the document image which was read out by the image reader section with respect to a document management device to be connected to the line, wherein, when the line number extractor section extracts a plurality of line numbers of external devices to be connected to a line out of the document image, the line number selector section selects one line number from the plurality of line numbers extracted, by making a comparison between the plurality of line numbers extracted and a line number of the transmitting end.

With this arrangement, by using any communications terminal device, a document can be obtained from a document management device of the lowest communications costs at any time. In addition, since security for document management in the document management device is fully improved, a highly effective document management system can be constructed.

Further, a document management system according to the present invention, including at least one document management device, and at least one communications terminal device which is connected to the document management device via a communications network, wherein:

the document management device includes: a memory section for storing a document to which an identification number is given; an input section for receiving an image including the identification number and summary information of the document to which the identification number is given from the communications terminal device; a control section made up of an extract section for extracting the identification number and the summary information from the inputted image which was inputted to the input section, a document obtainer section for searching and obtaining a document having the identification number which was extracted by the extract section out of documents stored in the memory section, and a judging section for judging as to whether the summary information extracted by the extract section is correct with respect to the document obtained by the document obtainer section; and an output section for outputting the document obtained by the document obtainer section when the judging section judges it to be correct, and the communications terminal device includes: an image reader section for reading a document image out of a document; a control section having a line number extractor section for extracting a plurality of line numbers of external devices to be connected to a line out of the document image which was read out by the image reader section, and a line number selector section for selecting a line number for connection from the plurality of line numbers extracted by the line number extractor section; a memory section for storing a communications cost table in which communications charges per unit time for connecting the line are classified based on the line numbers; and an image transmitter section for transmitting the document image which was read out by the image reader section with respect to an external device connected to the line, wherein, when the line number extractor section extracts a plurality of line numbers of the external devices to be connected to a line out of the document image, the line number selector section selects one line number from the plurality of line numbers extracted, using the communications cost table stored in the memory section.

With this arrangement, by using any communications terminal device, a document can be obtained from a document management device of the lowest communications costs at any time. In addition, since security for document management in the document management device is fully improved, a highly effective document management system can be constructed.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1 is a block diagram showing a structure of a document management device which is one embodiment of the present invention.

FIG. 2 is an explanatory drawing showing a structure of a document management table included in the document management device.

FIG. 5 is an explanatory drawing showing a structure of a document management table included in a document management device which is another embodiment of the present invention.

FIG. 8 is an explanatory drawing showing a document request form which is used in the document management device.

FIG. 10 is a block diagram showing a structure of a document management device which is a further embodiment of the present invention.

FIG. 11 is an explanatory drawing showing a document request form which is used in the document management device.

FIG. 12 is an explanatory drawing showing a structure of a document management table.

FIG. 14 is an explanatory drawing showing another document request form which is used in the document management device.

FIG. 18 is a line number input document which is used in the communications terminal device.

DESCRIPTION OF THE EMBODIMENTS

[First Embodiment]

Figure 3:
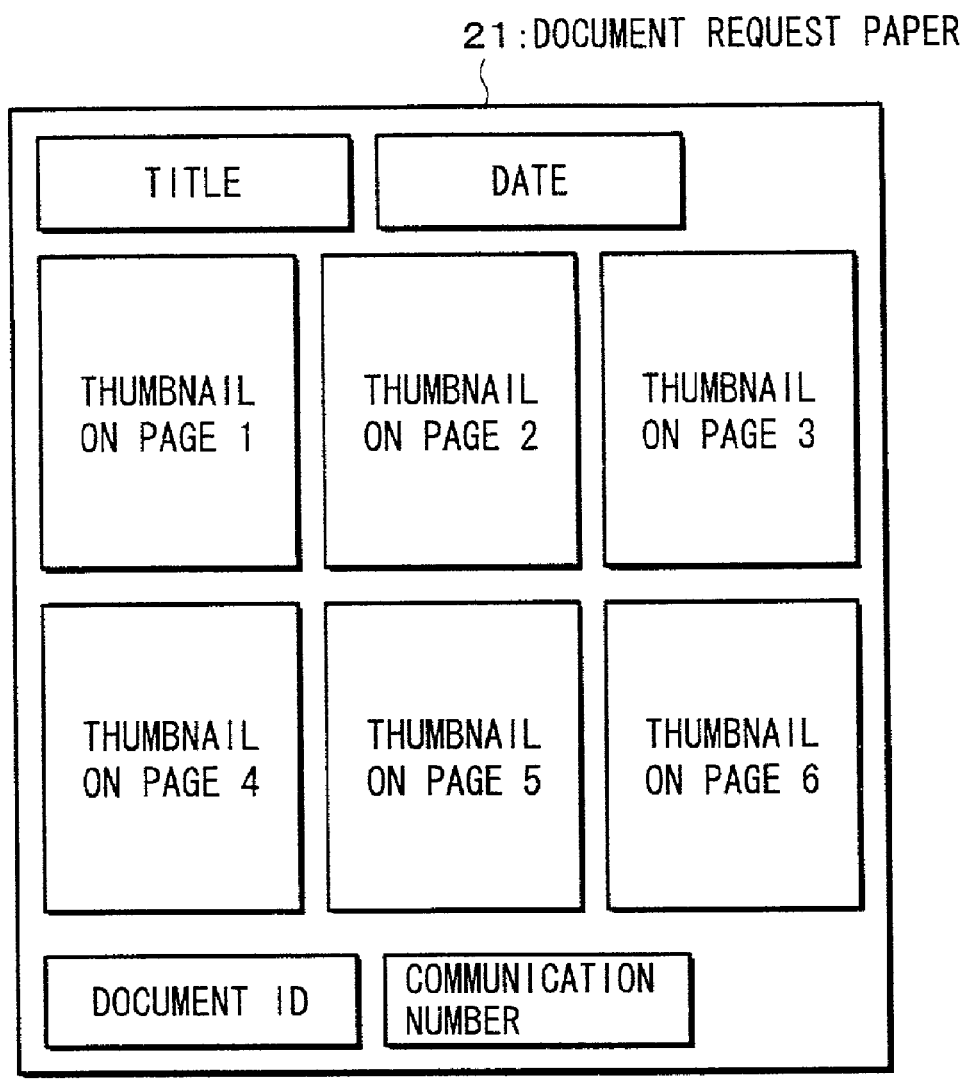
FIG. 3 is an explanatory drawing showing a document request form which is used in the document management device.

The following will explain one embodiment of the present invention with reference to drawings. FIG. 1 is a block diagram showing a schematic structure of a document management device according to the present embodiment. A document management device 1 includes a control section 2 for controlling an operation of a main body, a memory section 3 for storing a document to which an identification number (hereinafter referred to as "document ID") is given, a receiver section 4 for performing receiving process of an image which has been transmitted from a communications terminal device 7 which is capable of transmitting/receiving an image, such as a facsimile (fax) machine connected via a public network 6, and a transmitter section 5 for transmitting an image to the communications terminal device 7 connected via the public network 6. The receiver section 4 corresponds to an input section in a claim, and the transmitter section 5 corresponds to an output section in a claim. In addition, the communications terminal device 7 corresponds to an external device in a claim.

The control section 2 includes an extract section 11 for performing process of an image received by the receiver section 4 so as to extract a document ID and thumbnail information out of the image, a document obtainer section 12 for searching the memory section 3 so as to obtain the document having the document ID given thereto which was extracted by the extract section 11, and a judging section 13 for determining as to whether the thumbnail information extracted by the extract section 11 is correct with respect to the document obtained by the document obtainer section 12. Note that, the document ID corresponds to an identification number in a claim, and the thumbnail information corresponds to summary information in a claim. In addition, the thumbnail information herein is a condensed image of an appropriate document. Further, the judging section 13 determines as to whether there exists an image which coincides with the thumbnail information which was extracted by the extract section 11 inside the document obtained by the document obtainer section 12. Note that, the document management device is in effect made up of a PC (Personal Computer) and the like. Further, each structure in the control section 2 is to be realized by a program operated in the PC.

In the memory section 3 is stored a document management table 20 in which the document ID is associated with information (file path) indicating a memory location in the memory section 3 where the document having the document ID given thereto is stored. FIG. 2 shows one example of this document management table. The file path is an address showing the memory location of an appropriate document.

Further, to a user who is authorized to make access to the document management device 1, a document request form 21, for example, as shown in FIG. 3 is provided in advance. The document request form 21 is a form which is created for each document stored in the memory section 3. As shown in FIG. 3, the document request form 21 is a form on which a title (Title) of a corresponding document, creation date thereof (date), thumbnail information thereof (thumbnail information of pages 1 to 6), document ID thereof (document ID) and a line number (communication number) of the document management device 1 are respectively printed at a predetermined position. The document creation date is information which indicates a version of a document in a claim (details will be discussed below). Note that, the document request form 21 to be provided to each user only includes the one corresponding to a document which the user is authorized to obtain from the memory section 3, and the user is not provided with the document request form 21 which corresponds to a document obtainment whereof from the memory section 3 is prohibited. Namely, it is previously determined as to what sort of the document request form 21 is provided to each user.

Figure 4:
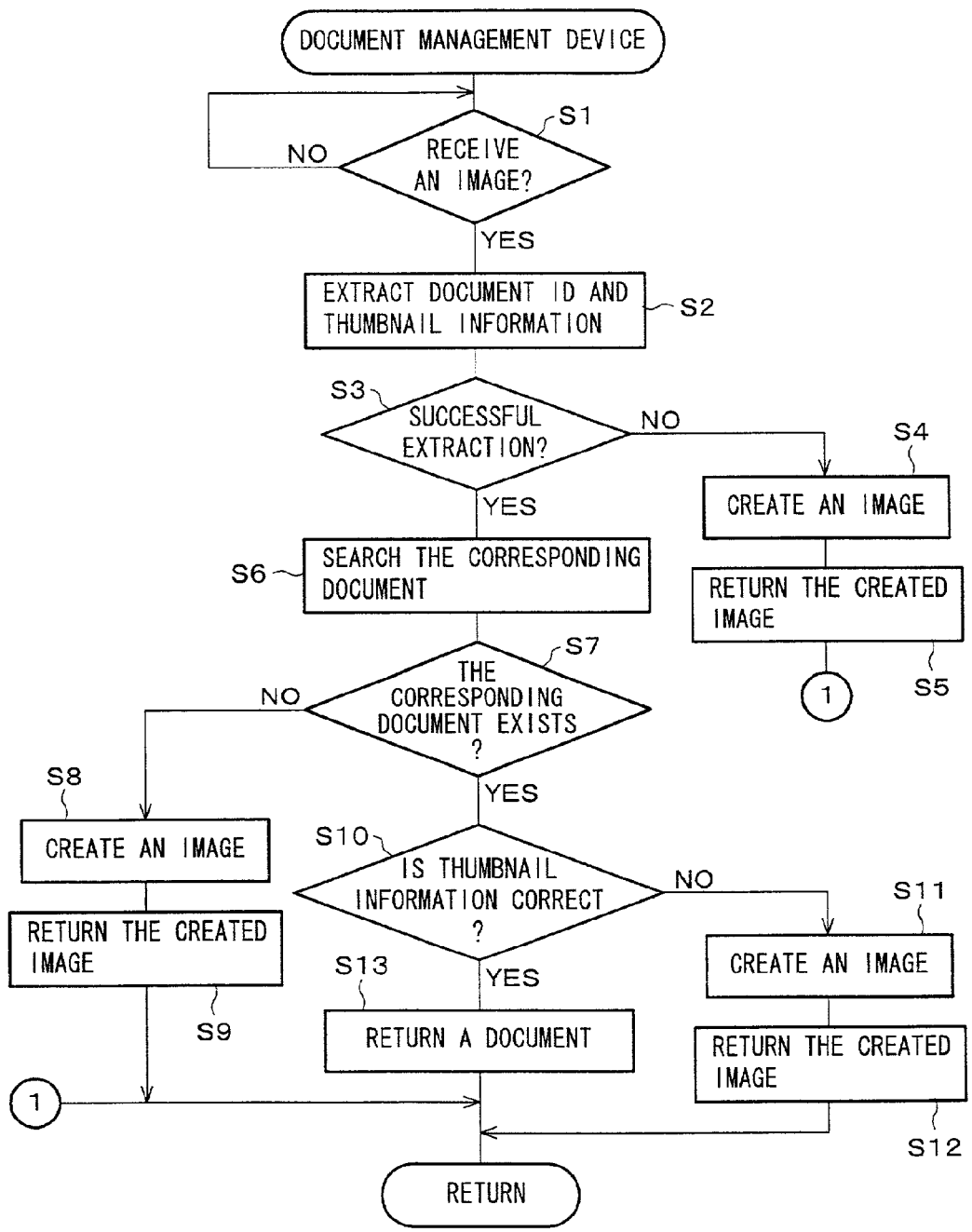
FIG. 4 is a flow chart showing an operation of the document management device.

The following will explain an operation of the document management device 1 according to the present embodiment. FIG. 4 is a flow chart showing an operation of the document management device 1. First, a user prepares the document request form 21 corresponding to a document to be obtained from the memory section 3. As explained, the user has previously been provided with the document request form 21. Using the communications terminal device 7 connected to the public network 6, the user transmits an image which is printed on the prepared document request form 21 to the document management device 1. In such a state that the process hitherto has been completed, the flow chart of FIG. 4 starts.

Note that, in a common communications terminal device 7, a line connected to the document management device 1 is disconnected when completing transmission of an image (fax communications). Here, when transmitting the image, the common communications terminal device 7 is arranged to transmit the read-out document image by attaching thereto a header including a line number of a transmitting end. Accordingly, the document management device 1 carries out recognizing process based on publicly known image recognizing process technology with respect to an image of a header part, thereby recognizing the line number of the communications terminal device 7 which was used by the user who transmitted the image. Alternatively, a structure in which the line number of the communications terminal device 7 that was used by the user is recognized by utilizing a transmitter's number notifying service, which is known to the public, may be adopted as well. Thus, the document management device 1 can recognize the line number of the communications terminal device 7 used by the user when transmitting the image which is printed on the document request form 21, thereby requesting the communications terminal device 7 to connect a line so as to transmit an appropriate image after the connection of the line.

The following will explain the flow chart of FIG. 4. When, in the document management device 1, the receiver section 4 receives an image of the document request form 21 which has been transmitted via the public network 6 (STEP 1, hereinafter referred to as "S1") extract process is carried out to extract a document ID and thumbnail information out of the image which was received ("received image", hereinafter) (S2). The extract process is performed by the extract section 11 provided in the control section 2. In S2, when failing to extract at least one of the document ID and the thumbnail information out of the received image ("NO" in S3), the document management device creates an image indicative of the failure (S4), and returns the created image from the transmitter section 5 to the communications terminal device 7 from which the received image was transmitted (S5). Note that, as explained, since the document management device 1 can recognize the line number of the communications terminal device 7 used by the user, it can return the image created in S4 by connecting the line to the communications terminal device 7 from which the received image was transmitted.

Alternatively, when successfully extracting both the document ID and the thumbnail information out of the received image ("YES" in S3), the document management device 1 searches for the document management table 20 by utilizing the document ID extracted herein as a key, then, obtain a document having an appropriate document ID given thereto from the memory section 3 (S6). When failing to obtain the document having the appropriate document ID given thereto from the memory section 3 in S6 (when the document having appropriate document ID given thereto is not stored in the memory section 3) ("NO" in S7), the document management device 1 creates an image indicative of the failure (S8), and returns the created image from the transmitter section 5 to the communications terminal device 7 from which the received image was transmitted (S9).

Further, when obtaining the document having the appropriate document ID given thereto from the memory section 3 ("YES" in S7), the document management device 1 determines as to whether the thumbnail information extracted from the received image is a condensed image of the document obtained in S6 (whether the thumbnail information is correct) (S10). When determining that the thumbnail information extracted from the received image in S10 is not correct ("NO" in S10), the document management device 1 creates an image indicative thereof (S11), then, returns the created image from the transmitter section 5 to the communications terminal device 7 from which the received image was transmitted (S12).

Alternatively, when determining that the thumbnail information extracted from the received image is correct ("YES" in S10), the document management device 1 returns the document obtained from the memory section in S6 to the communications terminal device 7 (S13).

Thus, by transmitting the image of the document request form 21 which is previously provided to the user to the document management device 1 by means of the communications terminal device 7, a desired document under the management of the document management device 1 can be obtained. In addition, ① when failing to extract the document ID and/or thumbnail information out of the received image, ② when the requested document does not exist in the memory section 3, or ③ when the thumbnail information extracted from the received image is not correct, the document management device 1 creates an image which is indicative of the failure and returns it to the communications terminal device 7, thereby notifying the user that the request of the document is not properly carried out. This prevents the user from interminably awaiting the requested document to be returned from the document management device 1 without knowing the occurrence of the failure.

Consequently, the user can promptly take a suitable step, for example, of resending the document request form 21, thereby obtaining a desired document from the document management device 1.

However, when a person who does not possess the document request form 21, i.e., a person who is not authorized to obtain a document which is under the management of the document management device 1 requests the document management device 1 to output the document, the document management device 1 does not return the appropriate document, thereby tightening security for document management in the document management device 1. Note that, it is arranged that output of the document be suspended when the thumbnail information extracted from the received image is not correct, and further, that the thumbnail information is a condensed image of the document makes it almost impossible for a person having no knowledge of the contents thereof to forge it, thus suppressing occurrence of such a problem that the document request form 21 is forged so as to illegally obtain a document from the document management device 1.

Furthermore, the communications terminal device 7 used by the user to transmit an image disconnects the line when completing transmission of the image of the document request form 21 to the document management device 1, thereby saving communications cost for a period of time in which the document management device 1 carries out internal process, thus suppressing waste of communications cost.

Note that, when arranging the communications terminal device 7 used by the user to transmit the image not to disconnect the line when completing the transmission of the image of the document request form 21 to the document management device 1, the line continues to be connected during the time for the internal process in the document management device 1, and therefore communications cost is charged. However, in that case, processes such as recognizing process of the document management device 1 to recognize a line number of the communications terminal device 7 and process of connecting a line to the communications terminal device 7 are not necessary, thereby reducing load of the document management device 1. Thus, a period of time from the transmission of the document request form by the user to the receipt of a desired document image can be shortened.

Further, in the document request form 21 of FIG. 3, a sheet of paper having thumbnail information of 6 pages of the corresponding document printed thereon is shown as an example, but the document request form is not limited to this. For example, a sheet of paper on which thumbnail information of the front page alone is printed, or a sheet of paper having thumbnail information of a partial area of the front page printed thereon may be adopted, instead. Thus, thumbnail information formed in the document request form 21 needs only to be image information capable of judging as to whether a request is correct.

[Second Embodiment]

The following will explain another embodiment of the present invention with reference to drawings. For ease of explanation, arrangements having the same functions as those shown in the drawings pertaining to the First Embodiment above will be given the same reference numerals, and explanation thereof will be omitted here.

A document management device 1 according to the present embodiment has the same arrangement shown in FIG. 1 in the First Embodiment. A distinction over the document management device 1 according to the First Embodiment is such that, when updating a document stored in the memory section 3, a document in a state before an update is not deleted from the memory section 3 but preserved therein. Thus, the document management device 1 of the present embodiment has an arrangement in which the memory section 3 stores documents having the same document ID by classifying them in accordance with versions thereof. That is, the memory section 3 stores, instead of the document management table of FIG. 2, a document management table 20, as shown in FIG. 5, which manages a plurality of documents having the same document ID by creation date (updated date) of the document. Note that, the creation date functions as version information in claims.

Figure 6:
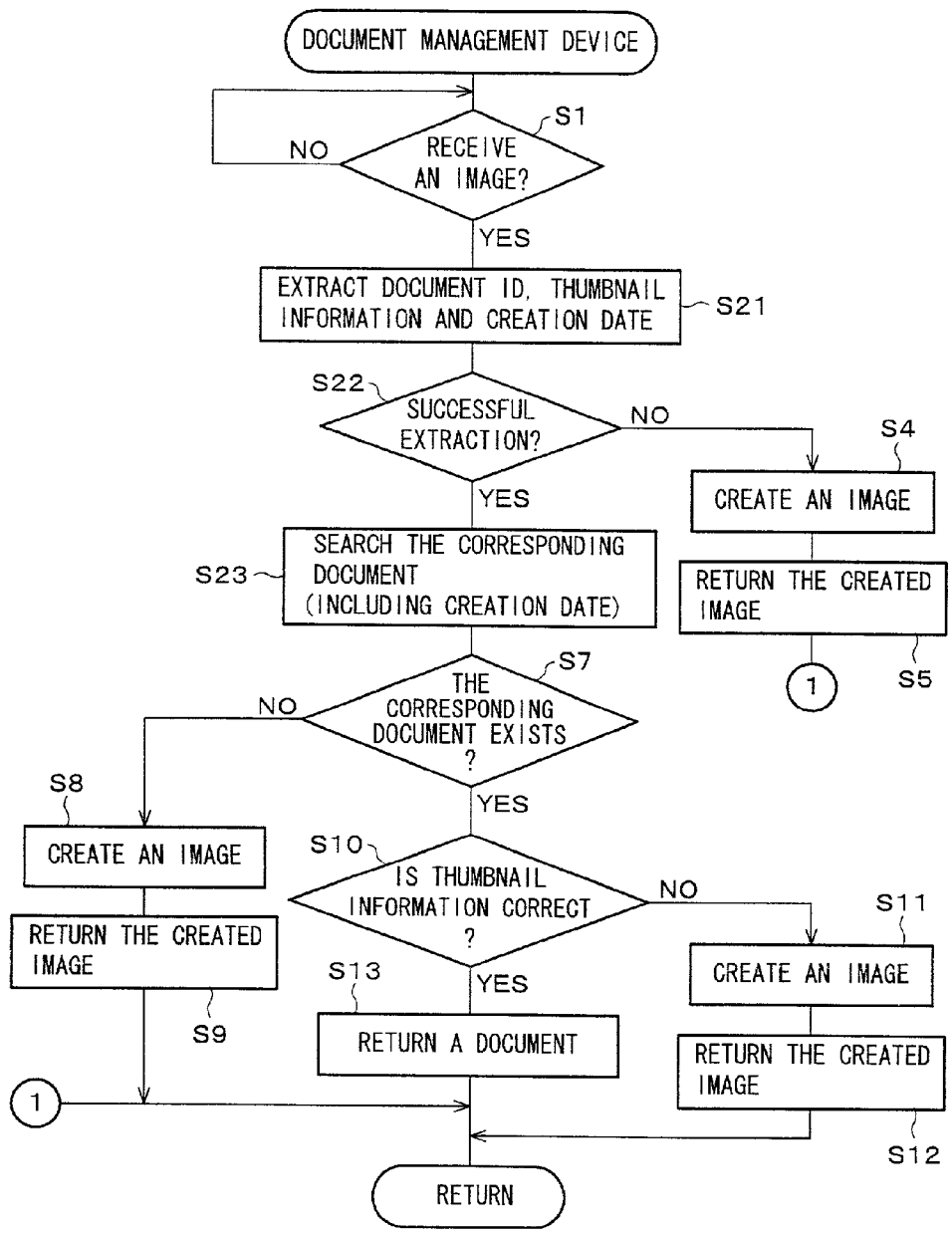
FIG. 6 is a flow chart showing an operation of the document management device.

FIG. 6 is a flow chart showing an operation of the document management device 1 according to one embodiment of the present invention. Note that, in FIG. 6, the same processes as those shown in FIG. 4 will be given the same step numbers (S numbers) as in FIG. 4. First, document ID, thumbnail information and creation date information are extracted from an received image received in S1 (S21). Then, in S22, it is judged as to whether the thumbnail information and creation date could be extracted (S22). When "YES" in S22, i.e., when the thumbnail information and creation date were all extracted, the sequence goes to S23 where documents which have the document ID and which have the same creation date which were extracted out of the received image are searched and obtained from the memory section 3. Note that, since processes of S23 onward and after it is judged "NO" in S22 are the same as those shown in FIG. 4 in the First Embodiment, explanation thereof will be omitted here.

Thus, the document management device 1 according to the present embodiment is capable of management of documents by classifying them in the memory section 3, and performing the processes of S21, S22 and S23 in place of S2, S3 and S6 shown in FIG. 4, respectively, thereby making it possible to request a document having a version which is not the latest as well.

Note that, it may also be arranged that a user can freely modify (rewrite) a creation date box in the document request form 21. This enables the user to request a plurality of documents having the same document ID (documents having different versions) by one sheet of the document request form 21.

Figure 7:
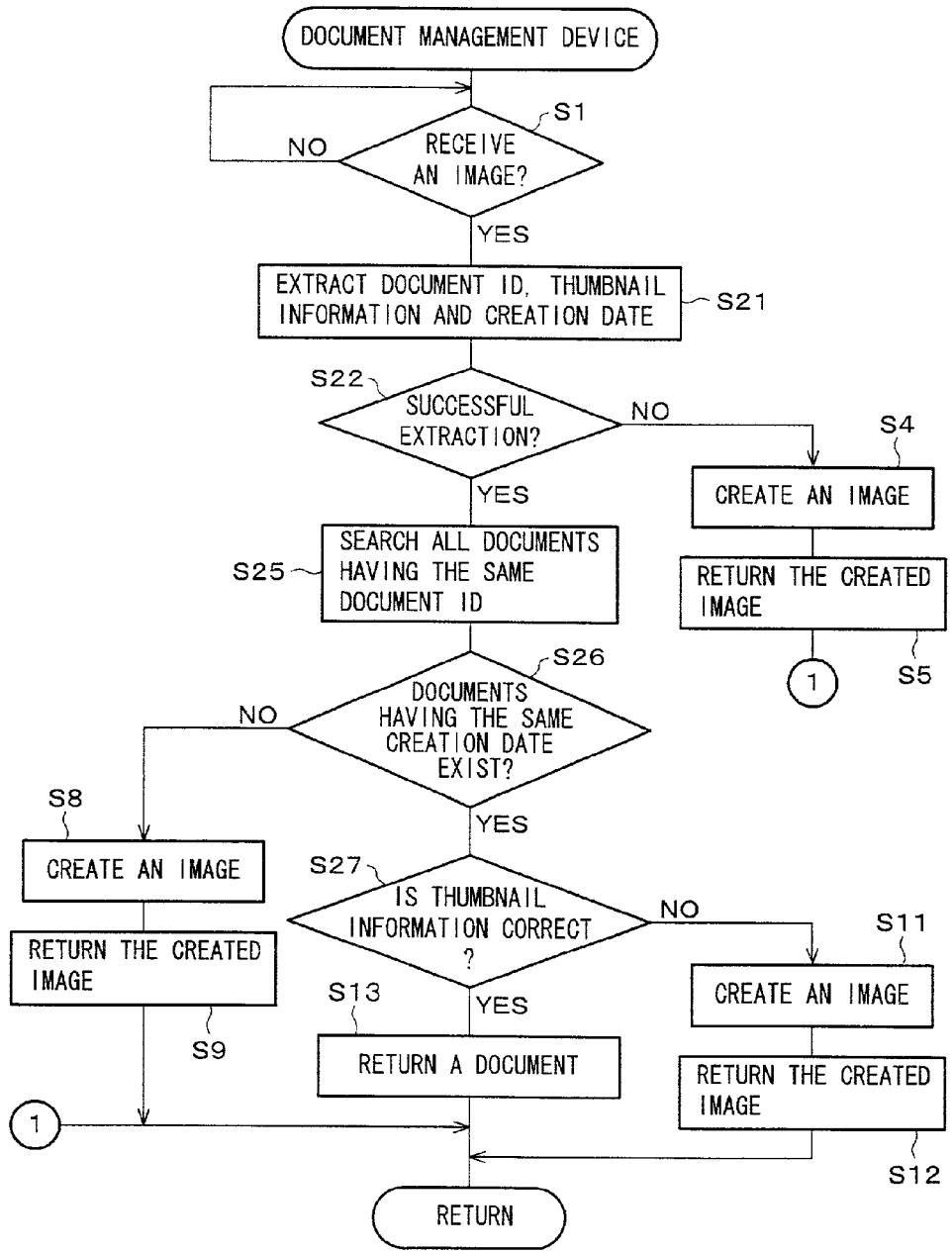
FIG. 7 is a flow chart showing another operation of the document management device.

Note that, when having the above arrangement, the process of S23, and the processes of S7 and S10 will be replaced with the processes of S25 through S27 shown below. Namely, the document management device 1, as shown in FIG. 7, obtains all the documents having the same document ID which were extracted from the received image in S25. Then, among the documents obtained in S25, presence or absence of a document having the creation date extracted from the received image is judged (S26), and if there is none ("NO" in S26), the sequence goes to S8. On the other hand, when there is a document having the creation date extracted from the received image ("YES" in S26), presence or absence of a document having the correct thumbnail information extracted from the received image is judged (S27), and when there is at least one document having the correct thumbnail information, a document having a designated document ID and the same creation date is returned with respect to the communications terminal device 7 (S13).

Thus, when having an arrangement in which the user can freely rewrite the creation date box in the document request form 21, all the document having the document ID extracted from the received image are searched so as to judge presence or absence of the document having the correct thumbnail information among them, thereby accurately selecting the document having the same creation date.

Figure 9:
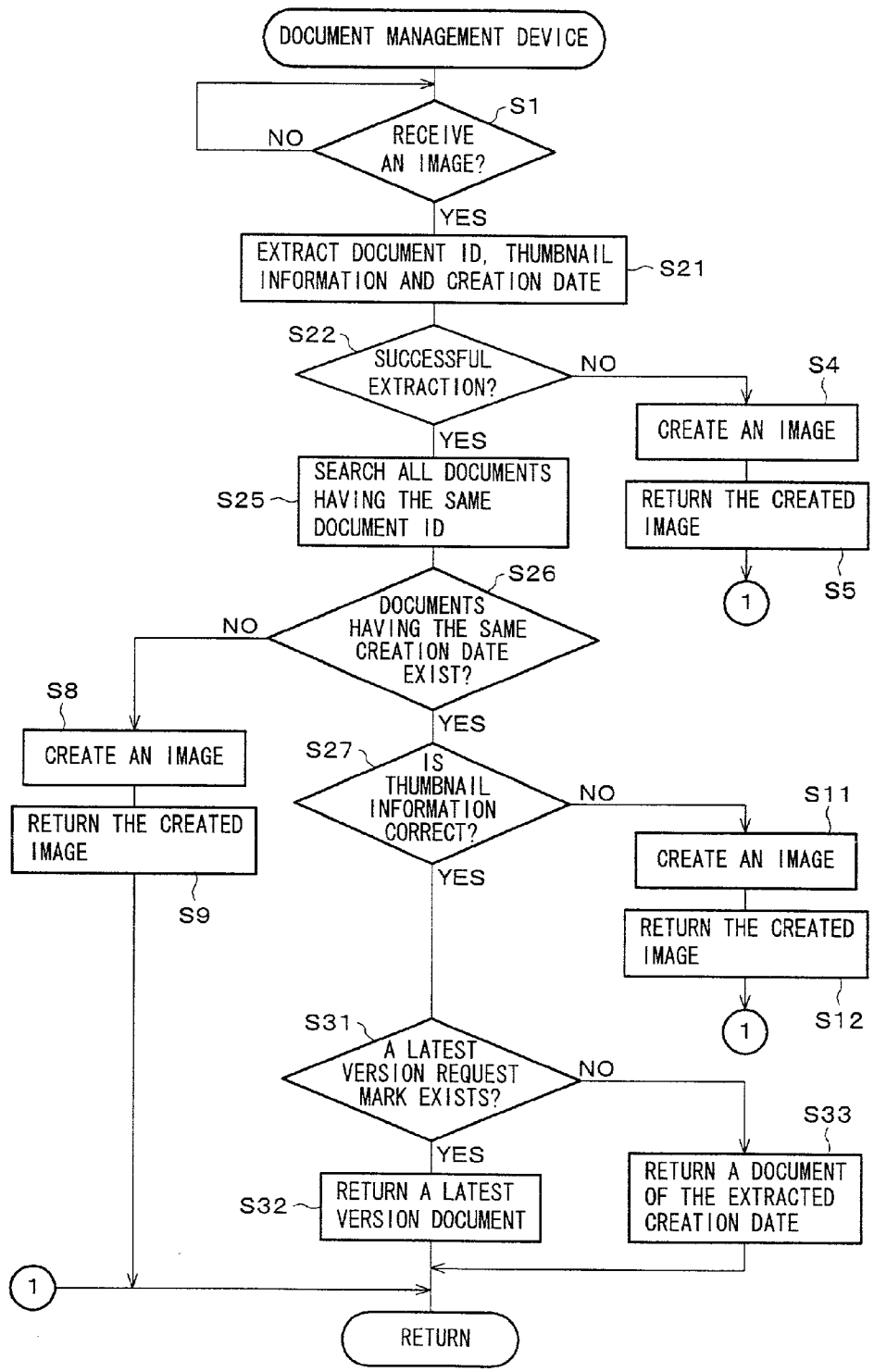
FIG. 9 is a flow chart showing a further operation of the document management device.

Alternatively, as shown in FIG. 8, a latest version request box 22 may be provided in a top right hand corner of the document request form 21. The following will explain an operation of the document management device 1 which is suitable for the use of the document request form 21 of FIG. 8 with reference to FIG. 9. FIG. 9 is a flow chart showing an operation of the document management device 1 according to the present embodiment. The document management device 1 of the present embodiment performs substantially the same processes as those shown in FIG. 7, except for processes of S27 onward, in which the thumbnail information extracted from the received image is judged to be correct. Specifically, after the thumbnail information is judged to be correct in S27, presence or absence of a predetermined mark written in the latest version request box 22 is judged from the received image (S31). In the case of presence of the predetermined mark in the latest version request box 22 ("YES" in S31), a document having the latest version is returned (S32), and in the case of absence of the predetermined mark ("NO" in S31), a document having the creation date extracted from the received image is returned (S33).

Consequently, a user who wishes to obtain the document having the latest version needs to write a predetermined mark in the latest version request box 22 and transmit the image of the document request form 21 with respect to the document management device 1, thus easily obtaining the document having the latest version even though not knowing when the latest version of a document was updated (not knowing the creation date).

Note that, as shown in FIG. 8, as a predetermined mark to be written in the latest version request box 22 of the document request form 21, marks which a user can easily write, such as "○", may be adopted. Furthermore, in case where an image in which a creation date box is left blank is transmitted, regardless of presence or absence of a predetermined mark in the latest version request box, either the document of the latest version or a document having the same thumbnail information may be returned.

[Third Embodiment]

The following will explain even another embodiment of the present invention with reference to drawings. For ease of explanation, arrangements having the same functions as those shown in the drawings pertaining to the foregoing Embodiments will be given the same reference numerals, and explanation thereof will be omitted here.

FIG. 10 is a block diagram showing an arrangement of the document management device 1 which is one embodiment of the present invention. A distinction thereof over the arrangement of FIG. 1 is such that the control section 2 includes an approval section 14 (will be discussed later) for judging as to whether or not an approval mark is correct.

FIG. 11 is an explanatory drawing showing a document request form which is suitable for requesting a document with respect to the document management device 1 according to the present embodiment. This document request form 21 is substantially the same as that shown in FIG. 8, except for that an approval mark filling box 23 is provided in a bottom right hand corner of the form. Moreover, the memory section 3 of the document management device 1 stores a document management table 20 shown in FIG. 12. This document management table 20 is a table which stores a plurality of approval information by making them correspond to file paths each of which shows a memory location of a document ID and a document to which the document ID is given, as illustrated.

Here, the approval section 14 has such a function as to judge whether an approval mark which was extracted from an image of the document request form 21 received coincides with either one of the plurality of approval marks corresponding to a requested document, and when the extracted approval mark coincides with either one of the plurality of approval marks, the approval section 14 judges it to be correct, otherwise it can judge it to be incorrect when the extracted approval mark does not coincides with any one of the plurality of approval marks. In addition, as an approval mark, not only a password (character string) which is determined by a manager but also an image of, for example, a seal representing the manager.

Figure 13:
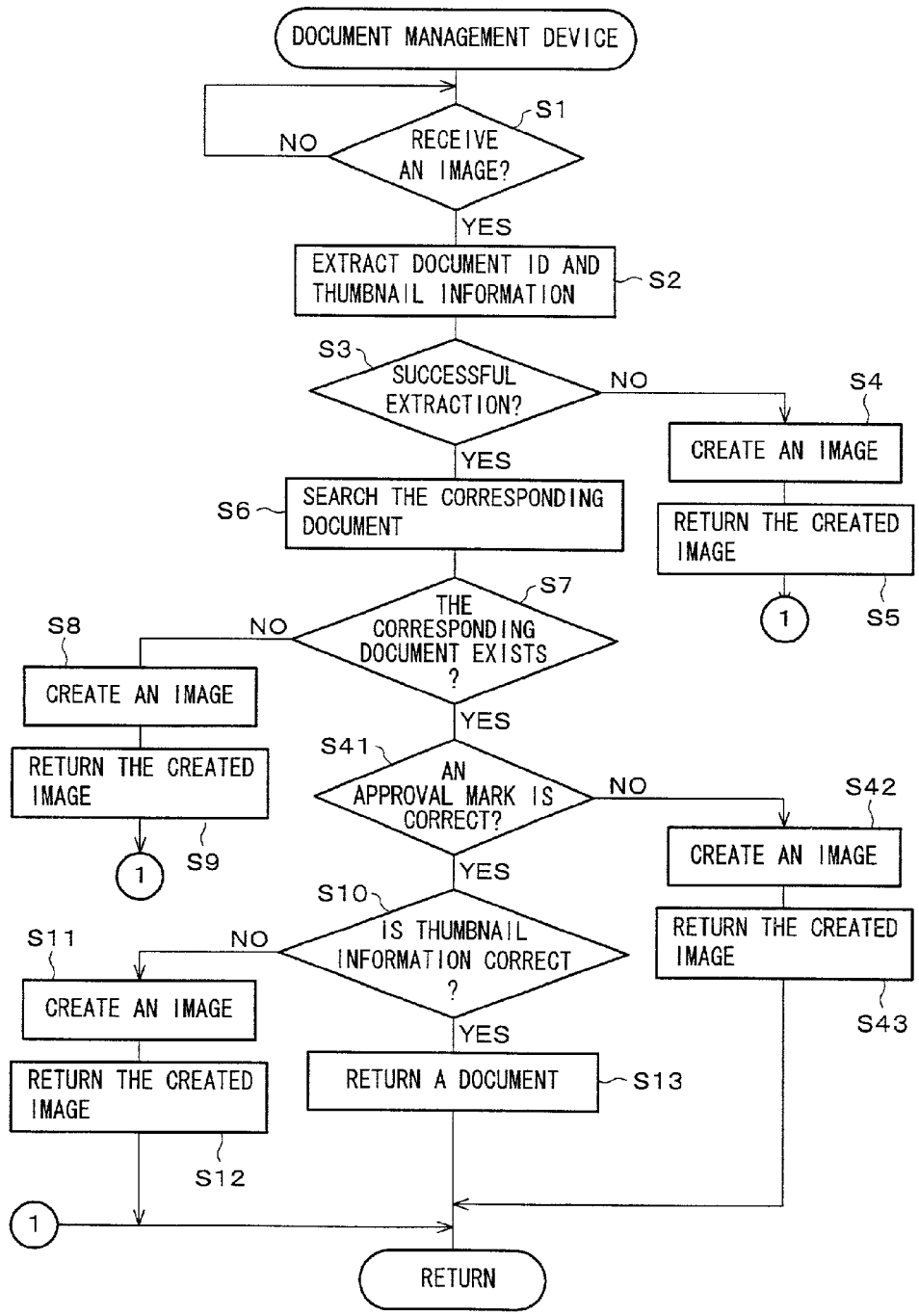
FIG. 13 is a flow chart showing an operation of the document management device.

The following will explain an operation of the document management device 1 according to the present embodiment. FIG. 13 is a flow chart showing an operation of the document management device according to the present embodiment. Note that, explanation of the same processes as those in the devices of the foregoing embodiments will be omitted. The document management device 1 of the present embodiment performs the same processes as those of steps S1 through S7 shown in FIG. 4, and when the document management device 1 of the present embodiment judges presence of a corresponding document in S7, it next judges as to whether an approval mark extracted from a received image coincides with either one of a plurality of approval marks corresponding to the corresponding document (S41). Here, in case where the extracted approval mark does not coincide with either one of the plurality of approval marks corresponding to the corresponding document ("NO" in S41), the document management device 1 creates an image which is indicative of such a failure (S42), and transmits the image with respect to the communications terminal device 7 (S43). On the other hand, in case where the extracted approval mark coincides with either one of the plurality of approval marks corresponding to the corresponding document ("YES" in S41), the document management device performs processes of S10 onward shown in FIG. 4.

Thus, when not using the document request form 21 having a correct approval mark written therein in the document management device 1 of the present embodiment, a document cannot be obtained, thereby further tightening security for document management in the document management device 1.

Further, since it is arranged such that a plurality of approval information can be provided in each document, and a document is returned when an approval mark extracted from a received image coincides with either one of a plurality of approval information set, thereby giving permission to obtain a part of documents under the management of a device main body when a necessity occurs, and to temporarily obtaining a document.

Figure 15:
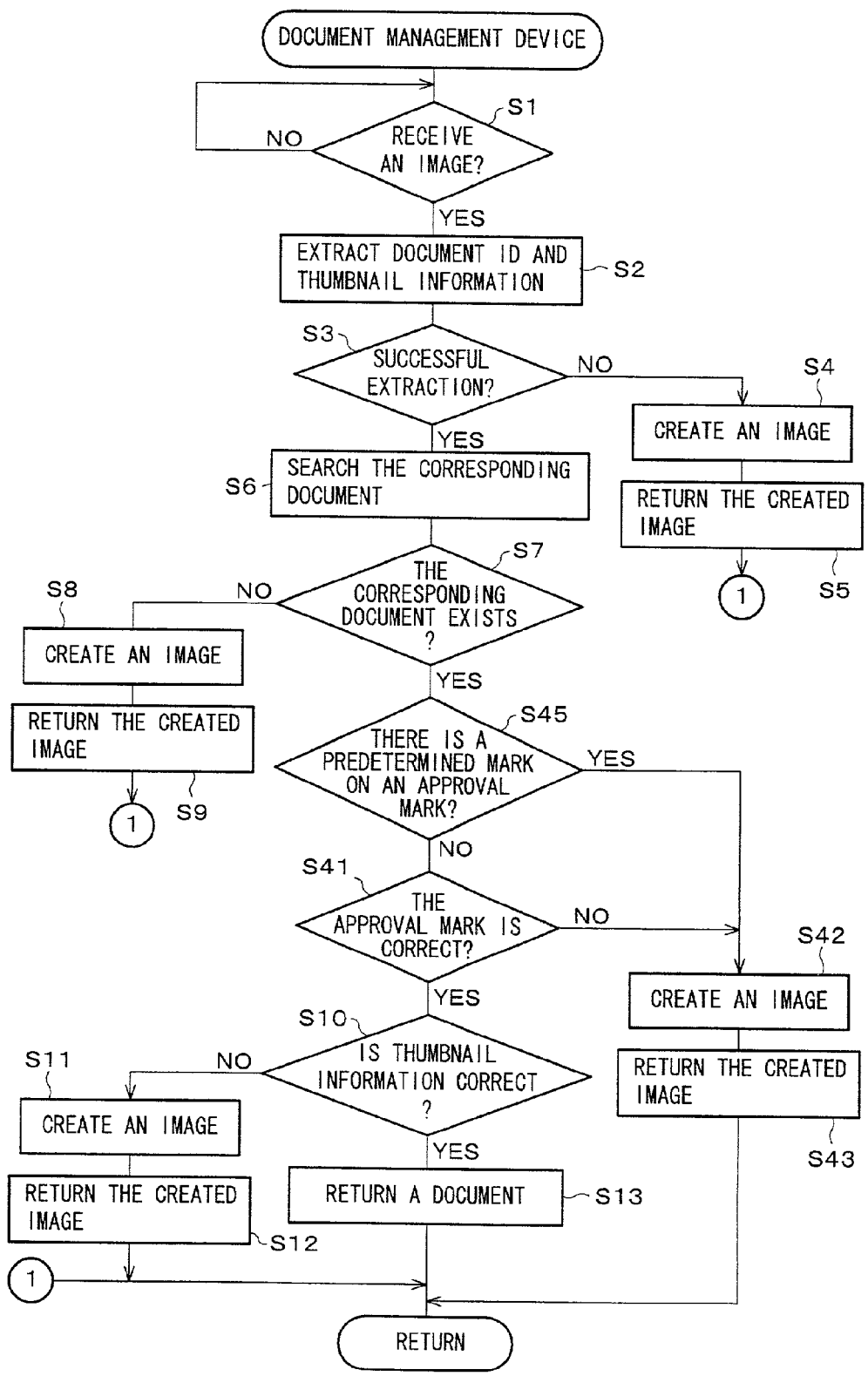
FIG. 15 is a flow chart showing another operation of the document management device.

Further, when an appropriate mark is added to the approval mark extracted from the received image, output of a document may be prohibited. For example, as shown in FIG. 14, in case where a line is drawn on the approval mark as the appropriate mark, output of a document can be prohibited. FIG. 15 is a flow chart showing an operation of a document management device according to such an arrangement.

The document management device 1 judges presence or absence of an appropriate predetermined mark on an approval mark extracted from the received image (S45), and when an appropriate mark is not given, the document management device 1 performs processes of S41 onward, and when an appropriate mark is given, it performs processes of S42 onward.

Thus, the document management device 1 according to the present embodiment does not return a requested document when an appropriate mark is given on the approval mark extracted from the received image, for example, when a line is drawn on the approval mark. Accordingly, when disposing of the document request form 21, doing so by drawing a line on the approval mark in the document request form 21 prevents a third person who picked up the document request form 21 from obtaining a document out of the document management device 1, thereby further tightening security for document management in the document management device 1.

Note that, an addition of such a function as to conduct management by classifying versions of documents discussed above with respect to the document management device 1 according to the present embodiment is also possible.

[Fourth Embodiment]

The following will explain still another embodiment of the present invention with reference to drawings. For ease of explanation, arrangements having the same functions as those shown in the drawings pertaining to the foregoing Embodiments above will be given the same reference numerals, and explanation thereof will be omitted here.

In the First to Third Embodiments were mainly explained arrangements and the descriptions of processes of the document management device 1, but the present embodiment will explain an arrangement and the descriptions of processes of the communications terminal device 7.

Figure 16:
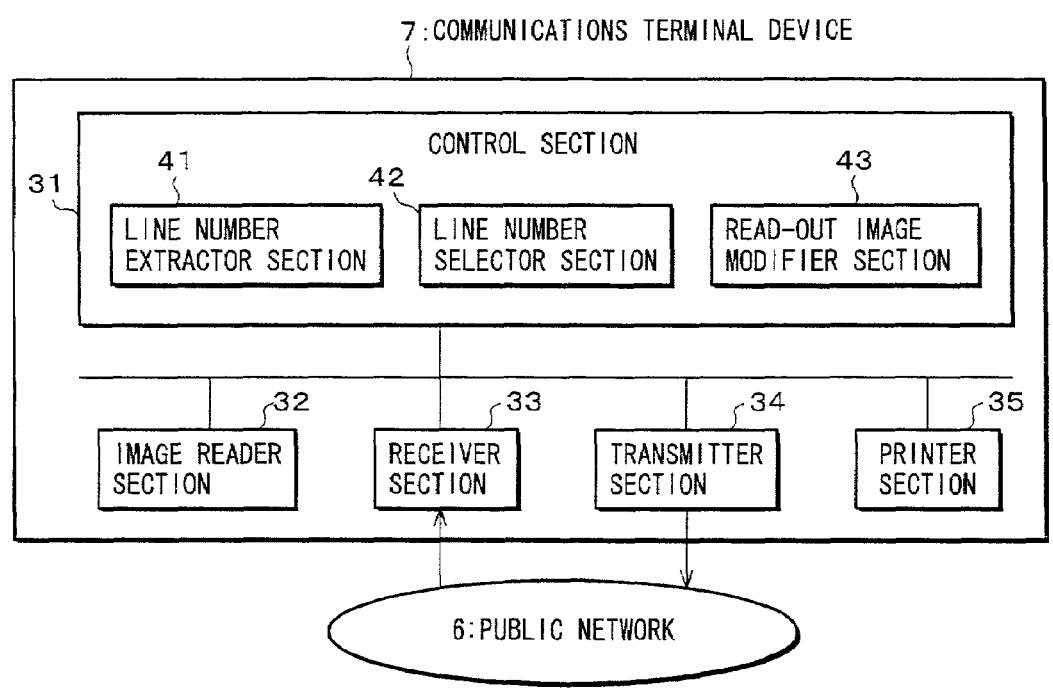
FIG. 16 is a block diagram showing a structure of a communications terminal device which is one embodiment of the present invention.

FIG. 16 is a drawing showing a schematic structure of a communications terminal device 7 according to the present embodiment. The communications terminal device 7 according to the present embodiment is made up of a control section 31 for controlling an operation in a main body, an image reader section 32 for reading a document image out of a document set, a receiver section 33 for receiving an image transmitted to a station connected to a line via a public network 6, a transmitter section 34 for transmitting the image read out by the image reader section 32 with respect to the station connected to the line via the public network 6, and a printer section 35 for printing the image received by the receiver section 33 on a sheet of paper.

The control section 31 includes a line number extractor section 41 for extracting a line number for requesting connection of the line out of the document image read out by the image reader section 32, a line number selector section 42 for selecting one of a plurality of line numbers extracted by the line number extractor section 41, using a line number of the transmitting end, and a read-out image modifier section for modifying the document image read out by the image reader section 32. The read-out image modifier section 43 corresponds to an image deleting function in claims.

The image reader section 32 has a scanner and the like for reading an image out of the document, and for example, the image reader section 32 includes a known ADF (Automatic Document Feeder) or RADF (Reversible Automatic Document Feeder) so as to transport a document set to a reading position one by one and read out the image of the document. Note that, as it is known, by providing the RADF can be read out images on the both sides of the document set.

The following will explain an operation of the communications terminal device 7 of the present embodiment. Note that, receiving process in the communications terminal device 7 according to the present embodiment is substantially the same as that of a conventional device such as a facsimile, and an image received from a station connected via the public network 6 is printed on sheet of paper in the printer section 35. Note that, detailed explanation of the receiving process will be omitted. The following will explain transmitting process of the communications terminal device 7 of the present embodiment.

Figure 17:
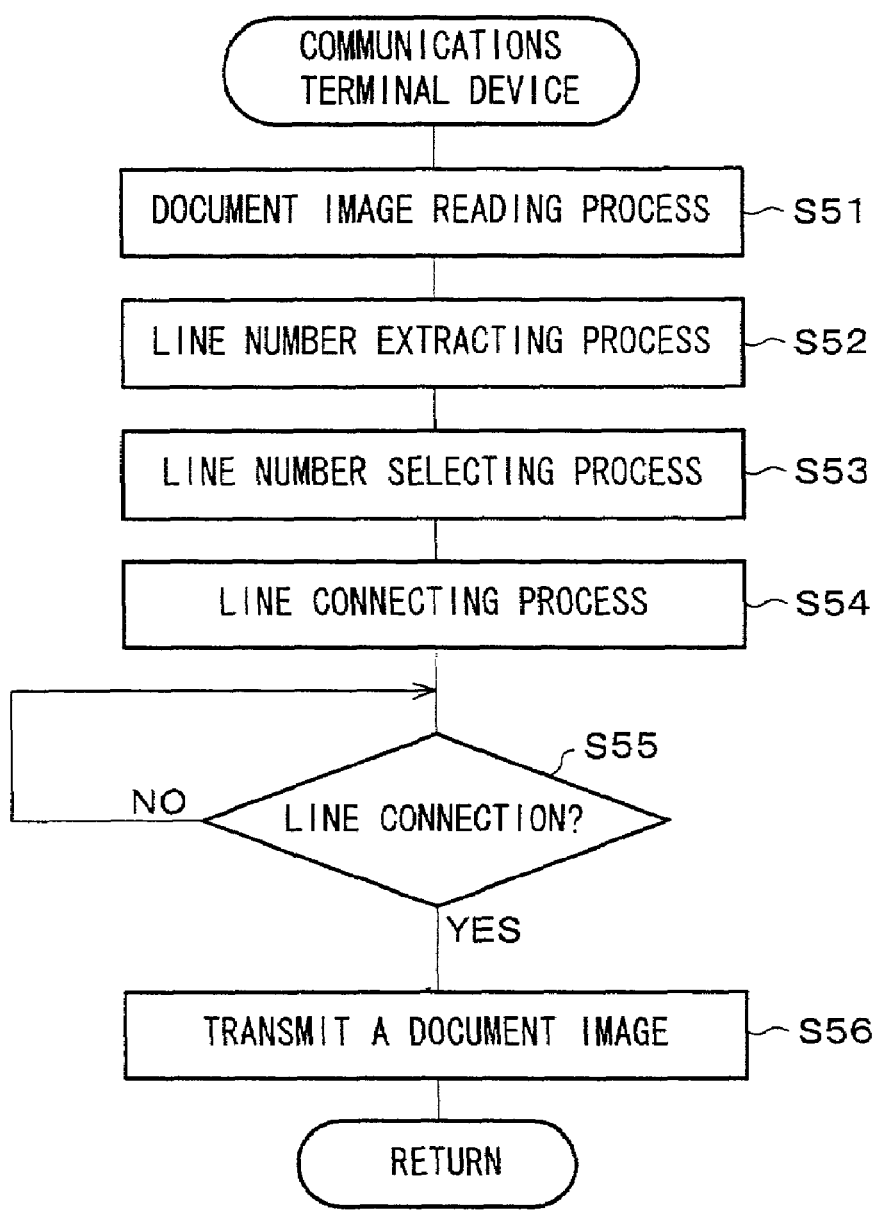
FIG. 17 is a flow chart showing an operation of the communications terminal device.

FIG. 17 is a flow chart showing the transmitting process of the communications terminal device 7 according to the present embodiment. On a predetermined location where the communications terminal device 7 according to the present embodiment first (or finally) reads out an image of a document is written a line number of a station at the receiving end. For example, an image of a document 51 (hereinafter referred to as a line number input form 51) shown in FIG. 18 is read out first (or finally). In FIG. 18, an area enclosed by a broken line is an area in which the line number of the station at the receiving end is written. The line number to be written in this area may be either one or more, provided that a user can communicate with either one of a plurality of stations corresponding to a plurality of line numbers written in a predetermined area (that the user can transmit an image).

The communications terminal device 7 read out an image of the document set at the image reader section 32 one by one (S51). The control section 31 performs line number extracting process for extracting a line number at the receiving end from an image of the line number input form 51 which it first (or finally) read out (S52). The process of S52 is such process that the line number extractor section 41 extracts a line number at the receiving end from the read-out image of the line number input form 51 by using a known image recognizing process technology. When extracting the line number at the receiving end, the control section 31 performs line number selecting process for selecting a line number of a station to be connected to a line (S53). The process of S53 is process which is performed by the line number selector section 42. Note that, details of the line number selecting process will be discussed later. When completing the line number selecting process (S53), the control section 31 performs line connecting process for connecting the line to the station selected as the receiving end by controlling the transmitter section 34 (S54). Then, when the line is connected to the station selected as the receiving end (S55), the document image read out in S51 is transmitted to the station connected to the line, thereby terminating the present process (S56).

Figure 19:
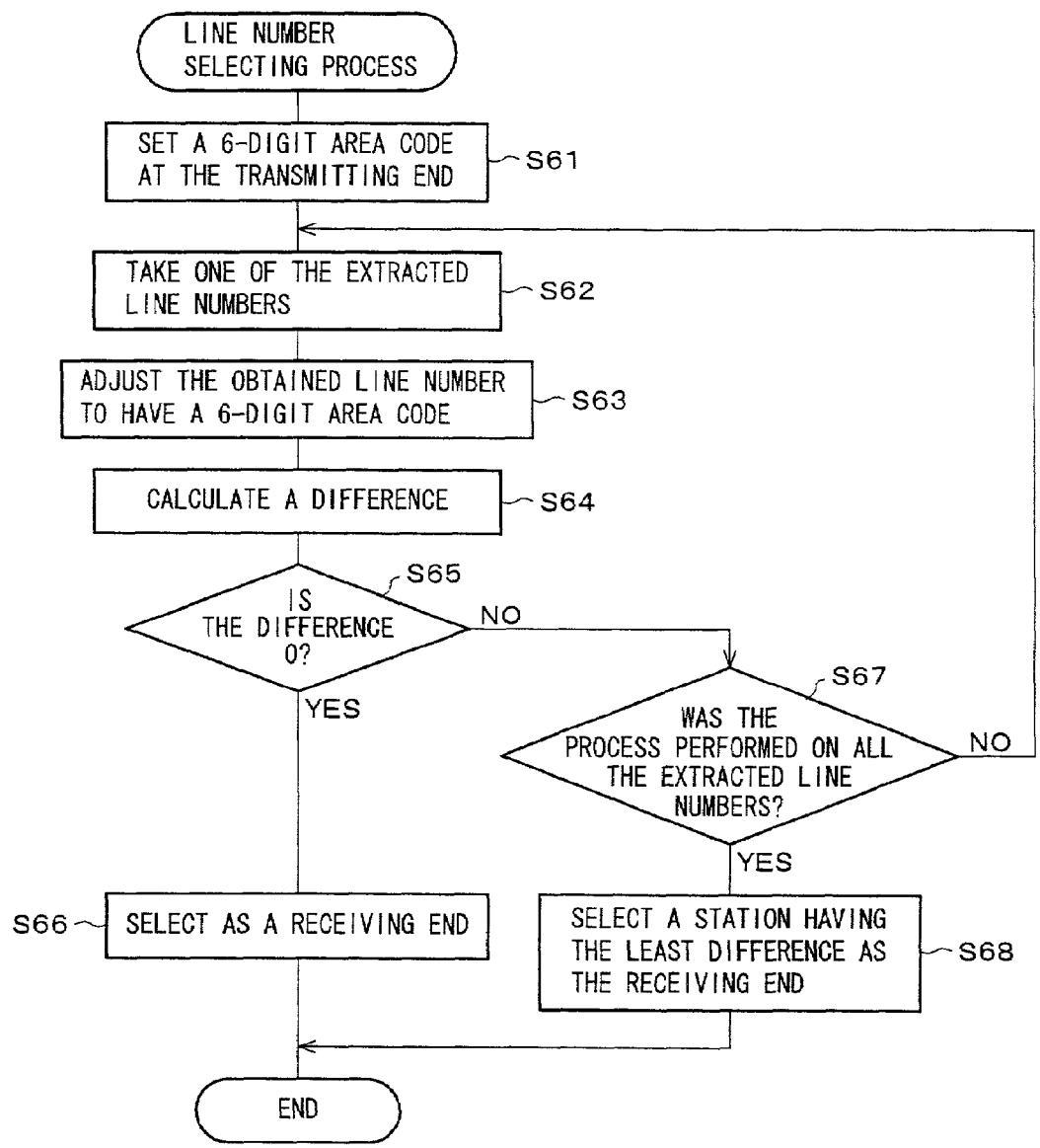
FIG. 19 is a flow chart showing a line number process in the communications terminal device.

The following will explain the line number selecting process in detail. FIG. 19 is a flow chart showing the line number selecting process. The control section 31 adjusts the area code of the line number at the transmitting end to have 6 digits (S61). The line number at the transmitting end is stored in an RAM (not shown) which is provided in the control section 31. Further, adjusting the area code to have 6 digits means that, when the number of digits of an area code is less than 6, the number of digits is increased to 6 by adding "0" at the end of the digits of the area code. For example, when the area code at the transmitting end is "03", "0" is repeated four times at the end of the area code to make "030000", and when the area code at the transmitting end is "0123", "0" is repeated twice at the end to make "012300".

Next, one of the line numbers extracted by the line number extracting process of S52 above is selected (S62), and the area code of the selected line number is adjusted to have 6 digits (S63), and a difference between this adjusted area code and the area code at the transmitting end is calculated (S64). When the difference is "0" ("YES" in S65), a line number at this time is selected as the receiving end (S66). However, when the difference is not "0", it is judged as to whether the processes of the step S62 onward were completed with respect to all the line numbers extracted in S52 (S67), and when the processes are not completed, the sequence goes back to S62, thus repeating the processes. In S67, when it is judged that the processes of S62 onward were completed with respect to all the line numbers extracted in S52, a line number having a minimum absolute value of the difference calculated in S64 is selected as the receiving end (S68). Note that, when there exists a plurality of line numbers each of which has a minimum absolute value of the difference, an appropriate one is selected therefrom as the receiving end.

Here, adjacent cities in a public network have area codes of highly similar numbers. Therefore, it is highly possible that a station of an area code having a minimum absolute value of the difference between the adjusted area code and the area code at the transmitting end is a station which exists in the nearest city from the transmitting end. Further, a charging system of communications costs to be charged with respect to line connection is such that, when a distance between the devices connected to the line is near, the cost is low, and when the distance is far, the cost is high. Consequently, in the most cases, it is highly possible that stations selected by the line number selecting process are the stations of the lowest communications costs.

Thus, in the communications terminal device 7 according to the present embodiment, in accordance with line connection is selected a station of the lowest communications costs to be charged as the receiving end, and the selected station is connected to the line for communications, thereby surely reducing communications costs. Further, it is arranged that, when detecting a station of the area code, the difference between which and the area code at the transmitting end is "0", the station is selected as the receiving end, thereby preventing waste of process time. Note that, the station of the difference of "0" above is a station existing in the same city as that of the transmitting end, and therefore a call becomes a local call but not an outer call, thereby being a station of the lowest communications costs.

[Fifth Embodiment]

The following will explain a further embodiment of the present invention with reference to drawings. For ease of explanation, arrangements having the same functions as those shown in the drawings pertaining to the foregoing Embodiments above will be given the same reference numerals, and explanation thereof will be omitted here.

Figures 20, 21:
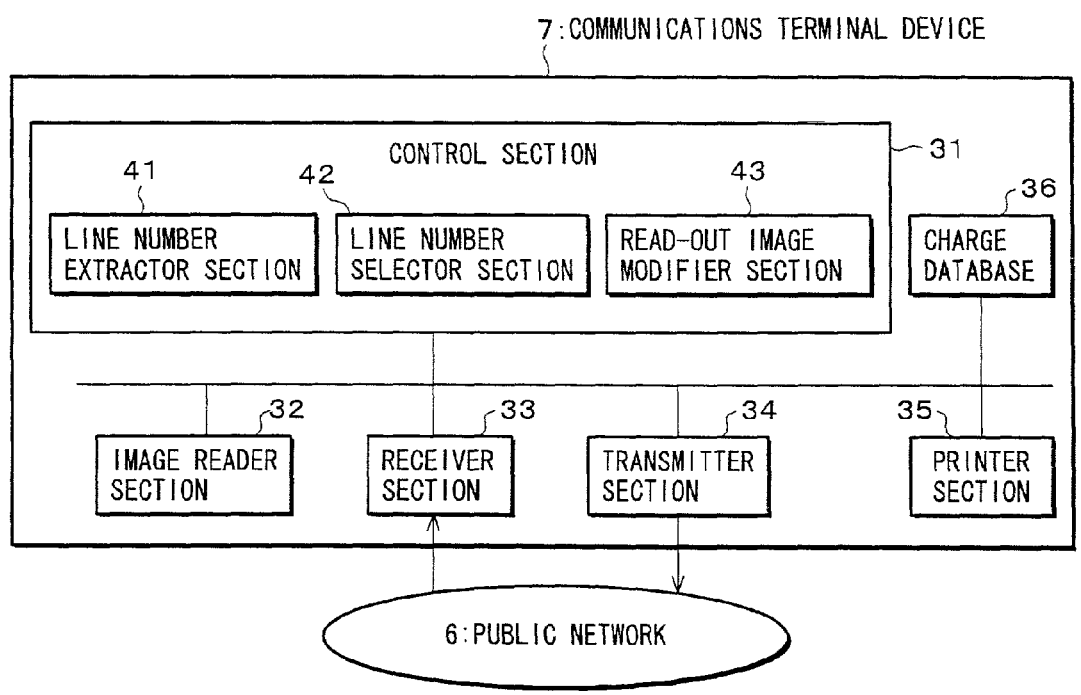
FIG. 20 is a block diagram showing a structure of a communications terminal device which is another embodiment of the present invention.
FIG. 21 is an explanatory drawing showing a connection charge table which is stored in the communications terminal device.

FIG. 20 is a block diagram showing an arrangement of a communications terminal device 7 of the present embodiment. The communications terminal device 7 according to the present embodiment is different by including a charge database (memory section) 36 storing a connection charge table 52 (see FIG. 21) in which a charge per unit time which is required in accordance with line connection to the device at the transmitting end. In the connection charge table 52, area codes are disposed side by side in order of low charges to be claimed per unit time.

Figures 22, 23:
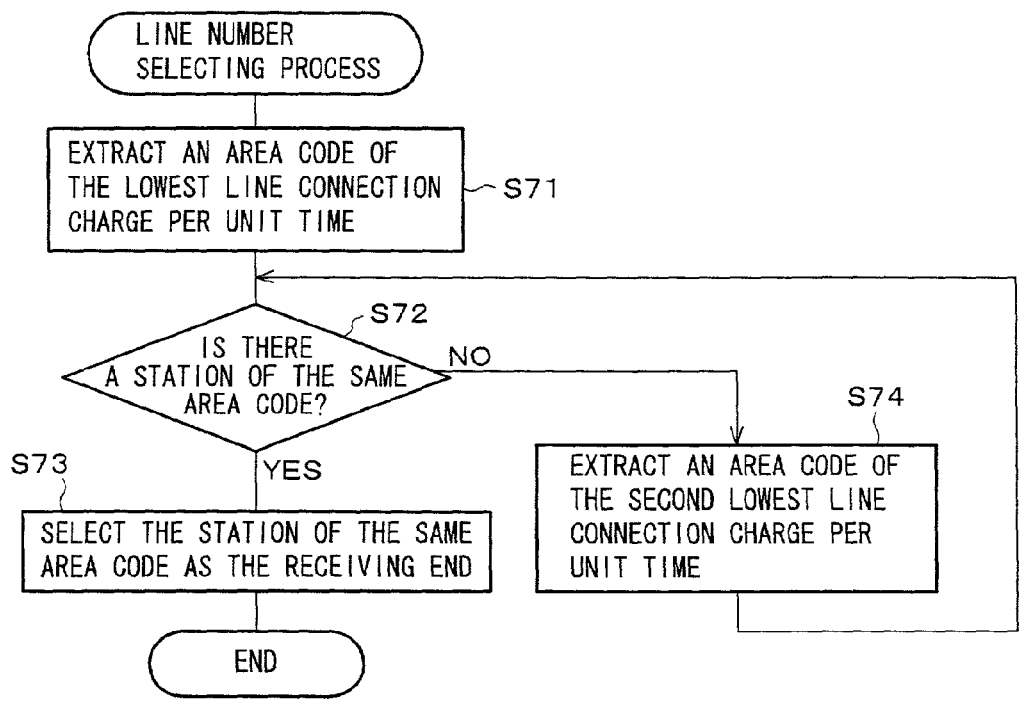
FIG. 22 is a flow chart showing a line number process in the communications terminal device.
FIG. 23 is an explanatory drawing showing a line number input document which is used in the communications terminal device which is one embodiment of the present invention.

The following will explain an operation of the communications terminal device 7 according to the present embodiment. A difference between the operation of the device of the Fourth Embodiment and the operation of the communications terminal device 7 according to the present embodiment is the line number selecting process according to S53. The following will explain the line number selecting process of the communications terminal device 7 according to the present embodiment. FIG. 22 is a flow chart showing the line number selecting process in the communications terminal device 7. The communications terminal device 7 selects area codes one by one in order of low charges to be claimed per unit time (S71), judges as to whether a station having the same number as that of the selected area code was extracted in S52 (S72), and selects, when extracted ("YES" in S72), the station as the station at the receiving end (S73). On the other hand, when the same station as that of the extracted area code is not extracted ("NO" in S72), an area code of the second lowest charge to be claimed per unit time, which is stored in the connection charge table 52, is selected and the processes are repeated (S74).

Accordingly, in the communications terminal device 7 according to the present embodiment, the station of the lowest communications charge can surely be selected as the receiving end. In addition, the communications terminal device 7 makes a comparison of area codes in order of the low charges to be claimed per unit time, and when the corresponding station number is extracted, the process is terminated as the station at the receiving end, thereby preventing waste of time to be taken in the line number selecting process.

Further, in the communications terminal device 7 of the present embodiment, a document image read out by the image reader section 32 is transmitted as it is with respect to a station to be connected to the line, but it is also possible that an image in which an image of an area where the line number was extracted by the read-out image modifier section 43 is deleted, and this image can be transmitted. Having this arrangement shorten time to be taken for transmission of an image with respect to the deleted area, thereby further reducing communications costs.

Further, it is arranged that a document, an image of which is to be read out first or finally, is a line number input document 51 (see FIG. 23) having only line numbers written therein, and this document image may be arranged not to be transmitted to a station connected to the line.

Furthermore, it may also be arranged such that images of both sides of a double-sided document in which only a line number is written on one side of the double-sided document, and the description of communication is written on the other side, are read out by using the RADF, and the image on one side is arranged not to be transmitted to a station connected to the line.

Thus, in the communications terminal device 7 according to the present embodiment, a station of the lowest communications costs to be charged in accordance with line connection is selected as the receiving end, and the selected station is connected to the line for communications, thereby surely reducing communications costs.

[Sixth Embodiment]

Figure 24:
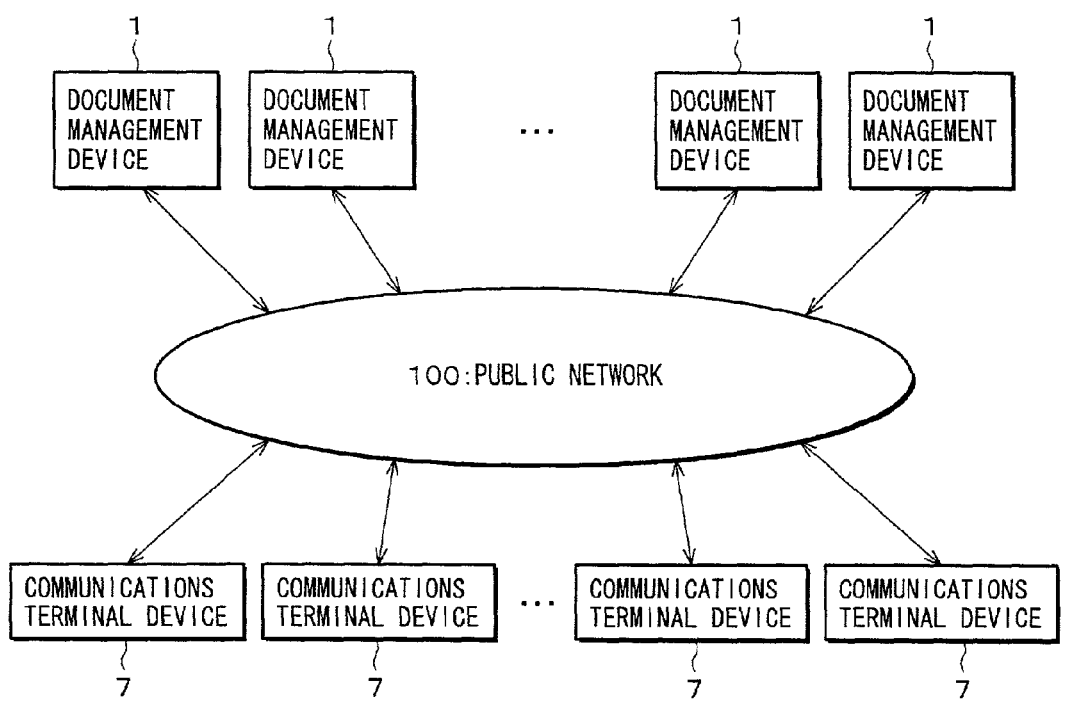
FIG. 24 is a block diagram showing a structure of a document management system which is one embodiment of the present invention.

The following will explain a still further embodiment of the present invention with reference to drawings. For ease of explanation, arrangements having the same functions as those shown in the drawings pertaining to the foregoing Embodiments above will be given the same reference numerals, and explanation thereof will be omitted here. FIG. 24 is a block diagram showing a schematic arrangement of a document management system according to the present embodiment. In this document management system, as shown in FIG. 24, a plurality of document management devices 1 is connected to a public network 100. Note that, the document management device 1 may be any one of the types of the document management devices shown in the First through Third Embodiments above. In addition, these document management devices 1 are provided all over the country, and therefore a user can obtain the same service, i.e., obtain a document by making access to any of the document management devices 1. Further, a plurality of communications terminal devices 7 explained in the foregoing Embodiments is connected to the public network 100. The communications terminal device 7 can be any type of the communications terminal devices 7 shown in the Fourth and Fifth Embodiments. In addition, a device which is used when a user requests for output of a document with respect to the document management device 1 is the communications terminal device 7.

In this system, not only the document request form 21 but also the line number input form 51 are provided to a user in advance. In the line number input form 51 are written line numbers of the plurality of document management devices 1 provided all over the country. Note that, the document request form 21 provided to the user is designed to correspond to the plurality of document management devices 1 connected to the public network 100.

Consequently, that the user sets the line number input form 51 and the document request form 21 corresponding to a desired document in the communications terminal device 7 enables the communications terminal device 7 to select the document management device 1 of the lowest communications costs, and to transmit an image of the document request form 21 by connecting the line to the document management device 1. In the document management device 1, as discussed, a document requested is obtained from documents under management of the memory section 3 so as to return it to the communications terminal device 7.

Thus, a user can always obtain a document from the document management device 1 of the lowest communications costs by using any type of the communications terminal device 7. In addition, as discussed, security for document management in the document management device 1 is sufficiently improved, thereby constructing a highly effective document management system.

Further, when using such a type of communications terminal device 7 that the document (image) reader section 32 includes the RADF, the document request form 21 that is shown in FIG. 3, 8 or 11 may have the line numbers of the plurality of document management devices 1 provided all over the country written on a rear side thereof. By doing so, a user is only required to deal with one sheet of paper, thereby improving controllability.

In the document management device as discussed, the input section receives an image transmitted from an external device to be connected via a communications network, as an inputted image, and the output section transmits a document which is obtained by the document obtainer section to the external device.

With this arrangement, since input of an image with respect to a main body can be performed in the external device connected via a network such as the public network, even when in a distant place from the main body of the document management device, a desired document can be obtained from the main body of the document management device.

Further, the summary information is at least a partial image of its corresponding document, and when an image which coincides with the summary information extracted by the extract section exists in the document obtained by the document obtainer section, the judging section judges it to be correct.

With this arrangement, by making the summary information be a partial or entire image of the corresponding document, it can be judged as to whether the summary information extracted from the inputted image is correct, by a simple image process to judge as to whether the summary information extracted from the inputted image coincides with an image of a document stored in the memory section.

Further, when the document obtainer section fails to obtain a document, the output section carries out output which is indicative of absence of the corresponding document in the memory section.

With this arrangement, when the document, output of which was requested, was not stored in the memory section, output indicative of absence is carried out, thereby making it possible to notify that the document, output of which was requested, is not managed in the device main body.

Further, the inputted image includes information indicative of a version of a document.

With this arrangement, since the inputted image is arranged to include information indicative of a version of the document, by managing the document in the main body by classifying versions thereof, a user can obtain a document having an old version as well.

Further, the memory section stores at least one version of a document among documents having the same identification number.

With this arrangement, documents of a plurality of versions can be managed by the same identification number.

Further, the control section judges presence or absence of a predetermined mark in the inputted image, and when the control section judges presence of a predetermined mark in the inputted image, the output section outputs a document of the latest version among documents obtained by the document obtainer section.

With this arrangement, when a predetermined mark exists in the inputted image, the latest version of the document, output of which is requested, is outputted. Accordingly, even a person who does not know as to which the document of the latest version is can easily obtain the document of the latest version by inputting an image to which the predetermined mark is attached.

Further, the control section judges presence or absence of version information in the inputted image, and when the control section judges presence of the version information in the inputted image, the output section outputs a document of a designated version out of the documents obtained by the document obtainer section.

With this arrangement, when the version information exists in the inputted image, the document, output of which is requested, is outputted, thus obtaining the document of the designated version out of a plurality of documents.

Further, the control section further includes an approval section for judging presence or absence of correct approval information in the inputted image, and when the approval section judges absence of the correct approval information in the inputted image, output from the output section is prohibited.

With this arrangement, when the inputted image does not include the correct approval information, even when the summary information is correct, output of the document is prohibited, thereby further tightening security for document management in the device main body.

Note that, approval information may be either a character string (password) or an image.

Further, each document stored in the memory section includes the approval information.

With this arrangement, the approval information can be set for each document under the management of the device main body. Accordingly, output is restricted for each document under the management of the device main body, thereby further tightening security for document management in the main body.

Further, when the inputted image includes predetermined information together with the approval information, output from the output section is prohibited.

With this arrangement, by adding the predetermined information to the approval information in a form to be used for input of an image when obtaining a desired document from the device main body, for example, by drawing a line on the approval information, a third person who picked up a form is prevented from obtaining a document from the main body by using the form, thereby further tightening security for document management in the device main body.

Further, when the approval section judges absence of the correct approval information in the inputted image, the output section carries out output indicative of absence of the correct approval information.

With this arrangement, by arranging such that, when the inputted image does not include the correct approval information, output indicative thereof is carried out, thereby notifying a user of incomplete approval information and instructing the user to promptly take a step.

Further, the line number selector section adjusts the number of digits of the area codes of the plurality of line numbers extracted by the line number extractor section and the number of digits of the area code of the line number at the transmitting end to have the same number of digits, and selects a line number for a minimum difference between them.

With this arrangement, a line number of the same area code can be searched, thereby reducing communications costs.

Further, the line number selector section adjusts the number of digits of the area codes of the plurality of lien numbers extracted by the line number extractor section and the number of digits of the area code of the line number at the transmitting end to have the same number of digits, and selects a line number for a minimum difference between them.

With this arrangement, a line of the lowest communications costs can be searched, thereby reducing communications costs.

Further, an image modifier section for deleting an image which is indicative of the line number of the external device to be connected to the line from the document image which was read out by the image reader section is further included, and the image transmitter section transmits an image from which the image indicative of the line number of the external device to be connected to the line was deleted by the image modifier section.

With this arrangement, since arranging that images of the plurality of line numbers written on the form not to be transmitted, time for communications is shortened, thereby further reducing communications costs.

Further, the image reader section reads images of front and rear sides of the document, and the line number extractor section extracts the line number of the external device to be connected to the line from an image of one side of the document, and the image transmitter section transmits an image of the other side of the document.

With this arrangement, by writing the line number on one side of the document to be transmitted, and the image to be transmitted on the other side, time for communications can be shortened, thereby further reducing communications costs.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A document management device, comprising:
   a memory section for storing a document which has an identification number;
   an input section for receiving an image including the identification number and summary information of the document which has the identification number;
   a control section comprising an extracting section for extracting the identification number and the summary information from the image received by the input section, a document obtaining section which uses the extracted identification number to search for and obtain from among documents in the memory section the document which has the identification number, and a judging section for judging whether the extracted summary information is correct with respect to the document obtained by the document obtaining section; and
   an output section for outputting the document obtained by the document obtaining section when the judging section judges the extracted summary information to be correct.

2. The document management device as set forth in claim 1, wherein:
   the image received by the input section is transmitted from an external device via a communications network, and the output section transmits the output document to the external device.

3. The document management device as set forth in claim 1, wherein:
   the summary information comprises at least a partial image, and when an image which coincides with the extracted summary information section exists in the document obtained by the document obtaining section, the judging section judges the extracted summary information to be correct.

4. The document management device as set forth in claim 1, wherein, when the document obtaining section fails to obtain the document which has the identification number, the output section provides an output indicative of the absence of the corresponding document in the memory section.

5. The document management device as set forth in claim 1, wherein the image received by the input section includes information indicative of a version of the document which has the identification number.

6. The document management device as set forth in claim 1, wherein the memory section stores one or more additional documents each of which has the identification number and a different version.

7. The document management device as set forth in claim 6, wherein:
   the control section judges a presence or absence of a predetermined mark in the image received by the input section, and when the control section judges the presence of the predetermined mark in the image received by the input section, the output section outputs the document having a latest version out of the documents obtained by the document obtaining section which have the identification number.

8. The document management device as set forth in claim 6, wherein:
the control section judges a presence or absence of version information in the image received by the input section, and when the control section judges the presence of the version information in the image received by the input section, the output section outputs the document having a version designated by the version information out of the documents obtained by the document obtaining section which have the identification number.

9. The document management device as set forth in claim 1, wherein:
the control section further includes an approval section for judging a presence or absence of correct approval information in the image received by the input section, and when the approval section judges the absence of the correct approval information in the image received by the input section, output from the output section is prohibited.

10. The document management device as set forth in claim 9, wherein each document which is stored in the memory section includes the approval information.

11. The document management device as set forth in claim 9, wherein, when the image received by the input section includes predetermined information together with the approval information, output from the output section is prohibited.

12. The document management device as set forth in claim 9, wherein, when the approval section judges the absence of the correct approval information in the image received by the input section, the output section provides an output indicative of the absence of the correct approval information.

13. A computer-readable recording medium which stores a document management program which is used in a computer system including a memory section for storing a document which has an identification number, an input section for receiving an image including the identification number and summary information of the document which has the identification number, and an output section, the document management program for instructing the computer system to execute the processes of:
(i) extracting the identification number and the summary information from the image received by the input section;
(ii) using the extracted identification number, searching for and obtaining from among documents in the memory section the document which has the identification number; and
(iii) judging whether the extracted summary information is correct with respect to the obtained document to determine whether to output the obtained document via the output section.

14. A document management system, comprising at least one document management device, and at least one communications terminal device which is connected to the document management device via a communications network,
wherein:
the document management device includes: a memory section for storing a document which has an identification number; an input section for receiving from the communications terminal device an image including the identification number and summary information of the document which has the identification number; a control section comprising an extracting section for extracting the identification number and the summary information from the image received by the input section, a document obtaining section which uses the extracted identification number to search for and obtain from among documents in the memory section the document which has the identification number, and a judging section for judging whether the extracted summary information is correct with respect to the document obtained by the document obtaining section; and an output section for outputting the document obtained by the document obtaining section to the communications terminal device when the judging section judges the extracted summary information to be correct, and
the communications terminal device includes: an image reader section for reading a document image; a control section having a line number extractor section for extracting from the document image a plurality of line numbers of document management devices to which the communication terminal device is connectable, and a line number selector section for selecting one of the line numbers from the extracted plurality of line numbers; and an image transmitter section for transmitting the document image to the document management device corresponding to the selected line number, wherein the line number is selected by the line number selector section based on a comparison between the extracted plurality of line numbers and a line number of the communications terminal device.

15. A document management system, comprising at least one document management device, and at least one communications terminal device which is connected to the document management device via a communications network,
wherein:
the document management device includes: a memory section for storing a document which has an identification number; an input section for receiving from the communications terminal device an image including the identification number and summary information of the document which has the identification number; a control section comprising an extracting section for extracting the identification number and the summary information from the image received by the input section, a document obtaining section which uses the extracted identification number to search for and obtain from among documents in the memory section the document which has the identification number, and a judging section for judging whether the extracted summary information is correct with respect to the document obtained by the document obtaining section; and an output section for outputting the document obtained by the document obtaining section when the judging section judges the extracted summary information to be correct, and
the communications terminal device includes: an image reader section for reading a document image; a control section having a line number extractor section for extracting from the document image a plurality of line numbers of document management devices to which the communications terminal device is connectable, and a line number selector section for selecting one of the line numbers from the extracted plurality of line numbers; a memory section for storing a communications cost table for communications charges per unit time for the line numbers; and an image transmitter section for transmitting the document image to the document management device corresponding to the selected line number, wherein the line number is selected by the line number selector section based on communications costs determined using the communications cost table.

16. A document management device, comprising:

a memory section for storing documents each of which has an identification number;

an input section for receiving an image including an identification number identifying a requested document and summary information of the requested document;

an output section;

a control section comprising an extracting section for extracting the identification number and the summary information of the requested document from the image received by the input section, a document obtaining section which retrieves from the memory section a document whose identification number corresponds to the extracted identification number, and a judging section which uses the extracted summary information to determine whether to output the retrieved document via the output section.

17. The document management device as set forth in claim 16, wherein:

the summary information comprises an image.

18. The document management device as set forth in claim 17, wherein the image comprises a condensed image of at least part of the requested document.

19. The document management device as set forth in claim 16, wherein the documents stored in the memory section comprise different versions of one or more of the documents, the different versions having the same identification number, but different version information.

20. The document management device as set forth in claim 19, wherein:

the control section determines a presence or absence of a predetermined mark in the image received by the input section, and the judging section uses the presence of the predetermined mark in the image received by the input section to determine to output the latest version of two or more documents retrieved from the memory section which have the extracted identification number.

21. The document management device as set forth in claim 19, wherein:

the extracting section extracts version information of the requested document from the image received by the input section, and the judging section uses the version information to determine to output the corresponding version of two or more documents retrieved from the memory section which have the extracted identification number.

22. The document management device as set forth in claim 16, wherein:

the control section further includes an approval section for judging a presence or absence of correct approval information in the image received by the input section, and when the approval section judges the absence of the correct approval information in the image received by the input section, output from the output section is prohibited.

23. The document management device as set forth in claim 16, wherein the image received by the input section comprises an image of a document request form on which the identification number and the summary information are printed.

* * * * *